United States Patent
Zheng

(10) Patent No.: US 9,798,728 B2
(45) Date of Patent: Oct. 24, 2017

(54) SYSTEM PERFORMING DATA DEDUPLICATION USING A DENSE TREE DATA STRUCTURE

(71) Applicant: NetApp, Inc., Sunnyvale, CA (US)

(72) Inventor: Ling Zheng, Saratoga, CA (US)

(73) Assignee: NetApp, Inc., Sunnyvale, CA (US)

( * ) Notice: Subject to any disclaimer, the term of this patent is extended or adjusted under 35 U.S.C. 154(b) by 369 days.

(21) Appl. No.: 14/339,890

(22) Filed: Jul. 24, 2014

(65) Prior Publication Data
US 2016/0026652 A1    Jan. 28, 2016

(51) Int. Cl.
G06F 17/00    (2006.01)
G06F 17/30    (2006.01)

(52) U.S. Cl.
CPC .. G06F 17/30097 (2013.01); G06F 17/30159 (2013.01)

(58) Field of Classification Search
CPC ......... G06F 17/30156; G06F 17/30097; G06F 17/30159
See application file for complete search history.

(56) References Cited

U.S. PATENT DOCUMENTS

| | | |
|---|---|---|
| 5,459,857 A | 10/1995 | Ludlam et al. |
| 5,511,190 A | 4/1996 | Sharma et al. |
| 5,937,425 A | 8/1999 | Ban |
| 5,991,862 A | 11/1999 | Ruane |
| 6,219,800 B1 | 4/2001 | Johnson et al. |
| 6,257,756 B1 | 7/2001 | Zarubinsky et al. |
| 6,275,898 B1 | 8/2001 | DeKoning |
| 6,347,337 B1 | 2/2002 | Shah et al. |

(Continued)

FOREIGN PATENT DOCUMENTS

| | | |
|---|---|---|
| EP | 0726521 A2 | 8/1996 |
| EP | 1970821 A1 | 9/2008 |

(Continued)

OTHER PUBLICATIONS

"Duplicate Record Elimination in Large Data Files". Dina Bitton and David Dewitt, pp. 11, date Oct. 26, 1999.*

(Continued)

*Primary Examiner* — Tarek Chbouki
(74) *Attorney, Agent, or Firm* — Cesari and McKenna, LLP

(57) ABSTRACT

In one embodiment, as new blocks of data are written to storage devices of a storage system, fingerprints are generated for those new blocks and inserted as entries into a top level (L0) of a dense tree data structure. When L0 is filled, the contents from L0 may be merged with level 1 (L1). After the initial merge, new fingerprints are added to L0 until L0 fills up again, which triggers a new merge. Duplicate fingerprints in L0 and L1 are identified which, in turn, indicates duplicate data blocks. A post-processing deduplication operation is then performed to remove duplicate data blocks corresponding to the duplicate fingerprints. In a different embodiment, as new fingerprint entries are loaded into L0, those new fingerprints may be compared with existing fingerprints loaded into L0 and/or other levels to facilitate inline deduplication to identify duplicate fingerprints and subsequently perform the deduplication operation.

19 Claims, 13 Drawing Sheets

(56) References Cited

U.S. PATENT DOCUMENTS

| | | |
|---|---|---|
| 6,434,662 B1 | 8/2002 | Greene et al. |
| 6,526,478 B1 | 2/2003 | Kirby |
| 6,560,196 B1 | 5/2003 | Wei |
| 6,578,158 B1 | 6/2003 | Deitz et al. |
| 6,604,155 B1 | 8/2003 | Chong, Jr. |
| 6,609,176 B1 | 8/2003 | Mizuno |
| 6,704,839 B2 | 3/2004 | Butterworth et al. |
| 6,741,698 B1 | 5/2004 | Jensen |
| 6,779,003 B1 | 8/2004 | Midgley et al. |
| 6,895,500 B1 | 5/2005 | Rothberg |
| 6,904,470 B1 | 6/2005 | Ofer et al. |
| 6,912,645 B2 | 6/2005 | Dorward et al. |
| 6,928,526 B1 | 8/2005 | Zhu et al. |
| 7,047,358 B2 | 5/2006 | Lee et al. |
| 7,055,058 B2 | 5/2006 | Lee et al. |
| 7,065,619 B1 | 6/2006 | Zhu et al. |
| 7,093,086 B1 | 8/2006 | Van Rietschote |
| 7,110,913 B2 | 9/2006 | Monroe et al. |
| 7,174,379 B2 | 2/2007 | Agarwal et al. |
| 7,188,149 B2 | 3/2007 | Kishimoto et al. |
| 7,191,357 B2 | 3/2007 | Holland et al. |
| 7,249,150 B1 | 7/2007 | Watanabe et al. |
| 7,251,663 B1 | 7/2007 | Smith |
| 7,257,690 B1 | 8/2007 | Baird |
| 7,325,059 B2 | 1/2008 | Barach et al. |
| 7,334,094 B2 | 2/2008 | Fair |
| 7,334,095 B1 | 2/2008 | Fair et al. |
| 7,366,865 B2 | 4/2008 | Lakshmanamurthy et al. |
| 7,370,048 B2 | 5/2008 | Loeb |
| 7,373,345 B2 | 5/2008 | Carpentier et al. |
| 7,394,944 B2 | 7/2008 | Boskovic et al. |
| 7,395,352 B1 | 7/2008 | Lam et al. |
| 7,415,653 B1 | 8/2008 | Bonwick et al. |
| 7,451,167 B2 | 11/2008 | Bali et al. |
| 7,457,864 B2 | 11/2008 | Chambliss et al. |
| 7,464,125 B1 | 12/2008 | Orszag et al. |
| 7,529,780 B1 | 5/2009 | Braginsky et al. |
| 7,529,830 B2 | 5/2009 | Fujii |
| 7,543,100 B2 | 6/2009 | Singhal et al. |
| 7,543,178 B2 | 6/2009 | McNeill et al. |
| 7,562,101 B1 | 7/2009 | Jernigan et al. |
| 7,562,203 B2 | 7/2009 | Scott et al. |
| 7,603,391 B1 | 10/2009 | Federwisch et al. |
| 7,603,529 B1 | 10/2009 | MacHardy et al. |
| 7,644,087 B2 | 1/2010 | Barkai et al. |
| 7,668,885 B2 | 2/2010 | Wittke et al. |
| 7,680,837 B2 | 3/2010 | Yamato |
| 7,681,076 B1 | 3/2010 | Sarma |
| 7,701,948 B2 | 4/2010 | Rabje et al. |
| 7,743,035 B2 | 6/2010 | Chen et al. |
| 7,757,056 B1 | 7/2010 | Fair |
| 7,797,279 B1 | 9/2010 | Starling et al. |
| 7,814,064 B2 | 10/2010 | Vingralek |
| 7,818,525 B1 | 10/2010 | Frost et al. |
| 7,831,769 B1 | 11/2010 | Wen et al. |
| 7,849,098 B1 | 12/2010 | Scales et al. |
| 7,873,619 B1 | 1/2011 | Faibish et al. |
| 7,899,791 B1 | 3/2011 | Gole |
| 7,917,726 B2 | 3/2011 | Hummel et al. |
| 7,921,169 B2 | 4/2011 | Jacobs et al. |
| 7,949,693 B1 | 5/2011 | Mason et al. |
| 7,987,167 B1 | 7/2011 | Kazar et al. |
| 7,996,636 B1 | 8/2011 | Prakash et al. |
| 8,060,797 B2 | 11/2011 | Hida et al. |
| 8,074,019 B2 | 12/2011 | Gupta et al. |
| 8,078,918 B2 | 12/2011 | Diggs et al. |
| 8,082,390 B1 | 12/2011 | Fan et al. |
| 8,086,585 B1 | 12/2011 | Brashers et al. |
| 8,089,969 B2 | 1/2012 | Rabie et al. |
| 8,099,396 B1 | 1/2012 | Novick et al. |
| 8,099,554 B1 | 1/2012 | Solomon et al. |
| 8,127,182 B2 | 2/2012 | Sivaperuman et al. |
| 8,131,926 B2 | 3/2012 | Lubbers et al. |
| 8,140,821 B1 | 3/2012 | Raizen et al. |
| 8,140,860 B2 | 3/2012 | Haswell |
| 8,156,016 B2 | 4/2012 | Zhang |
| 8,156,290 B1 | 4/2012 | Vanninen et al. |
| 8,156,306 B1 | 4/2012 | Raizen et al. |
| 8,184,807 B2 | 5/2012 | Kato et al. |
| 8,205,065 B2 | 6/2012 | Matze |
| 8,209,587 B1 | 6/2012 | Taylor et al. |
| 8,214,868 B2 | 7/2012 | Hamilton et al. |
| 8,224,935 B1 | 7/2012 | Bandopadhyay et al. |
| 8,244,978 B2 | 8/2012 | Kegel et al. |
| 8,250,116 B2 | 8/2012 | Mazzagatti et al. |
| 8,261,085 B1 | 9/2012 | Fernandez |
| 8,327,103 B1 | 12/2012 | Can et al. |
| 8,341,457 B2 | 12/2012 | Spry et al. |
| 8,369,217 B2 | 2/2013 | Bostica et al. |
| 8,417,987 B1 | 4/2013 | Goel et al. |
| 8,452,929 B2 | 5/2013 | Bennett |
| 8,463,825 B1 | 6/2013 | Harty et al. |
| 8,468,368 B2 | 6/2013 | Gladwin et al. |
| 8,489,811 B1 | 7/2013 | Corbett et al. |
| 8,495,417 B2 | 7/2013 | Jernigan, IV et al. |
| 8,520,855 B1 | 8/2013 | Kohno et al. |
| 8,539,008 B2 | 9/2013 | Faith et al. |
| 8,560,879 B1 | 10/2013 | Goel |
| 8,566,617 B1 | 10/2013 | Clifford |
| 8,583,865 B1 | 11/2013 | Sade et al. |
| 8,589,625 B2 | 11/2013 | Colgrove et al. |
| 8,595,434 B2 | 11/2013 | Northcutt et al. |
| 8,595,595 B1 | 11/2013 | Grcanac et al. |
| 8,600,949 B2 | 12/2013 | Periyagaram et al. |
| 8,645,664 B1 | 2/2014 | Colgrove et al. |
| 8,645,698 B2 | 2/2014 | Yi et al. |
| 8,671,265 B2 | 3/2014 | Wright |
| 8,706,701 B1 | 4/2014 | Stefanov et al. |
| 8,732,426 B2 | 5/2014 | Colgrove et al. |
| 8,751,763 B1 | 6/2014 | Ramarao |
| 8,762,654 B1 | 6/2014 | Yang et al. |
| 8,775,868 B2 | 7/2014 | Colgrove et al. |
| 8,782,439 B2 | 7/2014 | Resch |
| 8,787,580 B2 | 7/2014 | Hodges et al. |
| 8,799,571 B1 | 8/2014 | Desroches et al. |
| 8,799,705 B2 | 8/2014 | Hallak et al. |
| 8,806,115 B1 | 8/2014 | Patel et al. |
| 8,806,160 B2 | 8/2014 | Colgrove et al. |
| 8,824,686 B1 | 9/2014 | Ishii et al. |
| 8,832,363 B1 | 9/2014 | Sundaram et al. |
| 8,832,373 B2 | 9/2014 | Colgrove et al. |
| 8,839,008 B2 | 9/2014 | Maniktala |
| 8,850,108 B1 | 9/2014 | Hayes et al. |
| 8,855,318 B1 | 10/2014 | Patnala et al. |
| 8,856,593 B2 | 10/2014 | Eckhardt et al. |
| 8,874,842 B1 | 10/2014 | Kimmel et al. |
| 8,880,787 B1 | 11/2014 | Kimmel et al. |
| 8,892,818 B1 | 11/2014 | Zheng et al. |
| 8,904,231 B2 | 12/2014 | Coatney et al. |
| 8,922,928 B2 | 12/2014 | Powell |
| 8,930,778 B2 | 1/2015 | Cohen |
| 8,943,032 B1 | 1/2015 | Xu et al. |
| 8,943,282 B1 | 1/2015 | Armangau et al. |
| 8,949,568 B2 | 2/2015 | Wei et al. |
| 8,977,781 B1 | 3/2015 | Yokoi et al. |
| 8,996,468 B1 | 3/2015 | Mattox |
| 8,996,535 B1 | 3/2015 | Kimmel et al. |
| 8,996,790 B1 | 3/2015 | Segal et al. |
| 8,996,797 B1 | 3/2015 | Zheng et al. |
| 9,003,162 B2 | 4/2015 | Lomet et al. |
| 9,009,449 B2 | 4/2015 | Chou et al. |
| 9,037,544 B1 | 5/2015 | Zheng et al. |
| 9,058,119 B1 | 6/2015 | Ray, III et al. |
| 9,092,142 B2 | 7/2015 | Nashimoto et al. |
| 9,152,684 B2 | 10/2015 | Zheng et al. |
| 9,195,939 B1 * | 11/2015 | Goyal .............. G06N 5/02 |
| 9,229,642 B2 | 1/2016 | Shu et al. |
| 9,256,549 B2 | 2/2016 | Kimmel et al. |
| 9,268,502 B2 | 2/2016 | Zheng et al. |
| 9,298,417 B1 | 3/2016 | Muddu et al. |
| 9,367,241 B2 | 6/2016 | Sundaram et al. |
| 9,389,958 B2 | 7/2016 | Sundaram et al. |
| 9,405,783 B2 | 8/2016 | Kimmel et al. |
| 9,459,856 B2 | 10/2016 | Curzi et al. |

(56) References Cited

U.S. PATENT DOCUMENTS

| | | |
|---|---|---|
| 9,471,680 B2 | 10/2016 | Elsner et al. |
| 2002/0073068 A1 | 6/2002 | Guha |
| 2002/0073354 A1 | 6/2002 | Schroiff et al. |
| 2002/0091897 A1 | 7/2002 | Chiu et al. |
| 2002/0156891 A1 | 10/2002 | Ulrich et al. |
| 2002/0174419 A1 | 11/2002 | Alvarez et al. |
| 2002/0188711 A1 | 12/2002 | Meyer et al. |
| 2003/0005147 A1 | 1/2003 | Enns et al. |
| 2003/0105928 A1 | 6/2003 | Ash et al. |
| 2003/0115204 A1 | 6/2003 | Greenblatt et al. |
| 2003/0115282 A1 | 6/2003 | Rose |
| 2003/0120869 A1 | 6/2003 | Lee et al. |
| 2003/0126118 A1 | 7/2003 | Burton et al. |
| 2003/0126143 A1* | 7/2003 | Roussopoulos ... G06F 17/30592 |
| 2003/0135729 A1 | 7/2003 | Mason et al. |
| 2003/0159007 A1 | 8/2003 | Sawdon et al. |
| 2003/0163628 A1 | 8/2003 | Lin et al. |
| 2003/0172059 A1* | 9/2003 | Andrei ............. G06F 17/30454 |
| 2003/0191916 A1 | 10/2003 | McBrearty et al. |
| 2003/0195895 A1 | 10/2003 | Nowicki et al. |
| 2003/0200388 A1 | 10/2003 | Hetrick |
| 2003/0212872 A1 | 11/2003 | Patterson et al. |
| 2003/0223445 A1 | 12/2003 | Lodha |
| 2004/0003173 A1 | 1/2004 | Yao et al. |
| 2004/0052254 A1 | 3/2004 | Hooper |
| 2004/0054656 A1 | 3/2004 | Leung et al. |
| 2004/0107281 A1 | 6/2004 | Bose et al. |
| 2004/0133590 A1 | 7/2004 | Henderson et al. |
| 2004/0133622 A1 | 7/2004 | Clubb et al. |
| 2004/0133742 A1 | 7/2004 | Vasudevan et al. |
| 2004/0153544 A1 | 8/2004 | Kelliher et al. |
| 2004/0153863 A1 | 8/2004 | Klotz et al. |
| 2004/0202379 A1* | 10/2004 | Boskovic ................. G06T 5/20 382/262 |
| 2004/0215792 A1 | 10/2004 | Koning et al. |
| 2004/0236846 A1 | 11/2004 | Alvarez et al. |
| 2005/0027817 A1 | 2/2005 | Novik et al. |
| 2005/0043834 A1 | 2/2005 | Rotariu et al. |
| 2005/0076113 A1 | 4/2005 | Klotz et al. |
| 2005/0076115 A1 | 4/2005 | Andrews et al. |
| 2005/0091261 A1 | 4/2005 | Wu et al. |
| 2005/0128951 A1 | 6/2005 | Chawla et al. |
| 2005/0144514 A1 | 6/2005 | Ulrich et al. |
| 2005/0177770 A1 | 8/2005 | Coatney et al. |
| 2005/0203930 A1* | 9/2005 | Bukowski ......... G06F 17/30241 |
| 2005/0246362 A1 | 11/2005 | Borland |
| 2005/0246398 A1 | 11/2005 | Barzilai et al. |
| 2006/0004957 A1 | 1/2006 | Hand, III |
| 2006/0071845 A1 | 4/2006 | Stroili et al. |
| 2006/0072555 A1 | 4/2006 | St. Hilaire et al. |
| 2006/0072593 A1 | 4/2006 | Grippo et al. |
| 2006/0074977 A1 | 4/2006 | Kothuri et al. |
| 2006/0101091 A1* | 5/2006 | Carbajales ............ G06F 9/4435 |
| 2006/0129676 A1 | 6/2006 | Modi et al. |
| 2006/0136718 A1 | 6/2006 | Moreillon |
| 2006/0156059 A1 | 7/2006 | Kitamura |
| 2006/0165074 A1 | 7/2006 | Modi et al. |
| 2006/0206671 A1 | 9/2006 | Aiello et al. |
| 2006/0232826 A1 | 10/2006 | Bar-El |
| 2006/0282662 A1 | 12/2006 | Whitcomb |
| 2006/0288151 A1 | 12/2006 | McKenney |
| 2007/0033433 A1 | 2/2007 | Pecone et al. |
| 2007/0061572 A1 | 3/2007 | Imai et al. |
| 2007/0064604 A1 | 3/2007 | Chen et al. |
| 2007/0083482 A1 | 4/2007 | Rathi et al. |
| 2007/0083722 A1 | 4/2007 | Per et al. |
| 2007/0094452 A1 | 4/2007 | Fachan |
| 2007/0112723 A1 | 5/2007 | Alvarez et al. |
| 2007/0136269 A1 | 6/2007 | Yamakabe et al. |
| 2007/0143359 A1 | 6/2007 | Uppala et al. |
| 2007/0186066 A1 | 8/2007 | Desai et al. |
| 2007/0186127 A1 | 8/2007 | Desai et al. |
| 2007/0208918 A1 | 9/2007 | Harbin et al. |
| 2007/0234106 A1 | 10/2007 | Lecrone et al. |
| 2007/0245041 A1 | 10/2007 | Hua et al. |
| 2007/0266037 A1 | 11/2007 | Terry et al. |
| 2008/0065639 A1 | 3/2008 | Choudhary et al. |
| 2008/0071939 A1 | 3/2008 | Tanaka et al. |
| 2008/0104264 A1 | 5/2008 | Duerk et al. |
| 2008/0126695 A1 | 5/2008 | Berg |
| 2008/0127211 A1 | 5/2008 | Belsey et al. |
| 2008/0155190 A1 | 6/2008 | Ash et al. |
| 2008/0165899 A1 | 7/2008 | Rahman et al. |
| 2008/0201535 A1 | 8/2008 | Hara |
| 2008/0244158 A1 | 10/2008 | Funatsu et al. |
| 2008/0250270 A1 | 10/2008 | Bennett |
| 2009/0031083 A1 | 1/2009 | Willis et al. |
| 2009/0037500 A1 | 2/2009 | Kirshenbaum |
| 2009/0037654 A1 | 2/2009 | Allison et al. |
| 2009/0083478 A1 | 3/2009 | Kunimatsu et al. |
| 2009/0097654 A1 | 4/2009 | Blake |
| 2009/0132770 A1 | 5/2009 | Lin |
| 2009/0144497 A1 | 6/2009 | Withers |
| 2009/0150537 A1 | 6/2009 | Fanson |
| 2009/0157870 A1 | 6/2009 | Nakadai |
| 2009/0210611 A1 | 8/2009 | Mizushima |
| 2009/0225657 A1 | 9/2009 | Haggar et al. |
| 2009/0271412 A1 | 10/2009 | Lacapra et al. |
| 2009/0276567 A1 | 11/2009 | Burkey |
| 2009/0285476 A1 | 11/2009 | Choe et al. |
| 2009/0313503 A1 | 12/2009 | Atluri et al. |
| 2010/0011037 A1 | 1/2010 | Kazar |
| 2010/0023726 A1 | 1/2010 | Aviles |
| 2010/0030981 A1 | 2/2010 | Cook |
| 2010/0031315 A1 | 2/2010 | Feng et al. |
| 2010/0042790 A1 | 2/2010 | Mondal et al. |
| 2010/0057792 A1 | 3/2010 | Ylonen |
| 2010/0077380 A1 | 3/2010 | Baker et al. |
| 2010/0082648 A1 | 4/2010 | Potapov et al. |
| 2010/0088296 A1 | 4/2010 | Periyagaram et al. |
| 2010/0122148 A1 | 5/2010 | Flynn et al. |
| 2010/0161569 A1* | 6/2010 | Schreter ............ G06F 17/30327 707/696 |
| 2010/0161850 A1 | 6/2010 | Otsuka |
| 2010/0169415 A1 | 6/2010 | Leggette et al. |
| 2010/0174714 A1* | 7/2010 | Asmundsson .... G06F 17/30327 707/737 |
| 2010/0199009 A1 | 8/2010 | Koide |
| 2010/0199040 A1 | 8/2010 | Schnapp et al. |
| 2010/0205353 A1 | 8/2010 | Miyamoto et al. |
| 2010/0205390 A1 | 8/2010 | Arakawa |
| 2010/0223385 A1 | 9/2010 | Gulley et al. |
| 2010/0228795 A1 | 9/2010 | Hahn et al. |
| 2010/0228999 A1 | 9/2010 | Maheshwari et al. |
| 2010/0250497 A1 | 9/2010 | Redlich et al. |
| 2010/0250712 A1 | 9/2010 | Ellison et al. |
| 2010/0262812 A1 | 10/2010 | Lopez et al. |
| 2010/0268983 A1 | 10/2010 | Raghunandan |
| 2010/0281080 A1 | 11/2010 | Rajaram et al. |
| 2010/0293147 A1 | 11/2010 | Snow et al. |
| 2010/0306468 A1 | 12/2010 | Shionoya |
| 2010/0309933 A1* | 12/2010 | Stark ................. G06F 17/30327 370/503 |
| 2011/0022778 A1 | 1/2011 | Schibilla et al. |
| 2011/0035548 A1 | 2/2011 | Kimmel et al. |
| 2011/0060876 A1 | 3/2011 | Liu |
| 2011/0066808 A1 | 3/2011 | Flynn et al. |
| 2011/0072008 A1 | 3/2011 | Mandal et al. |
| 2011/0078496 A1 | 3/2011 | Jeddeloh |
| 2011/0087929 A1 | 4/2011 | Koshiyama |
| 2011/0093674 A1 | 4/2011 | Frame et al. |
| 2011/0099342 A1 | 4/2011 | Ozdemir |
| 2011/0099419 A1 | 4/2011 | Lucas et al. |
| 2011/0126045 A1 | 5/2011 | Bennett |
| 2011/0153719 A1 | 6/2011 | Santoro et al. |
| 2011/0154103 A1 | 6/2011 | Bulusu et al. |
| 2011/0161293 A1 | 6/2011 | Vermeulen et al. |
| 2011/0161725 A1 | 6/2011 | Allen et al. |
| 2011/0191389 A1 | 8/2011 | Okamoto |
| 2011/0191522 A1 | 8/2011 | Condict et al. |
| 2011/0213928 A1 | 9/2011 | Grube et al. |
| 2011/0219106 A1 | 9/2011 | Wright |
| 2011/0238857 A1 | 9/2011 | Certain et al. |
| 2011/0246821 A1 | 10/2011 | Eleftheriou et al. |

(56) References Cited

U.S. PATENT DOCUMENTS

| | | |
|---|---|---|
| 2011/0283048 A1 | 11/2011 | Feldman et al. |
| 2011/0289565 A1 | 11/2011 | Resch et al. |
| 2011/0296133 A1 | 12/2011 | Flynn et al. |
| 2011/0307530 A1 | 12/2011 | Patterson |
| 2011/0314346 A1 | 12/2011 | Vas et al. |
| 2012/0003940 A1 | 1/2012 | Hirano et al. |
| 2012/0011176 A1 | 1/2012 | Alzman |
| 2012/0011340 A1 | 1/2012 | Flynn et al. |
| 2012/0016840 A1 | 1/2012 | Lin et al. |
| 2012/0063306 A1 | 3/2012 | Sultan et al. |
| 2012/0072656 A1* | 3/2012 | Archak ............ G06F 17/30132 711/104 |
| 2012/0072680 A1 | 3/2012 | Kimura et al. |
| 2012/0078856 A1 | 3/2012 | Linde |
| 2012/0084506 A1 | 4/2012 | Colgrove et al. |
| 2012/0124282 A1 | 5/2012 | Frank et al. |
| 2012/0136834 A1* | 5/2012 | Zhao ................ G06F 11/1453 707/649 |
| 2012/0143877 A1 | 6/2012 | Kumar et al. |
| 2012/0150869 A1 | 6/2012 | Wang et al. |
| 2012/0150930 A1 | 6/2012 | Jin et al. |
| 2012/0151118 A1 | 6/2012 | Flynn et al. |
| 2012/0166715 A1 | 6/2012 | Frost et al. |
| 2012/0166749 A1 | 6/2012 | Eleftheriou et al. |
| 2012/0185437 A1 | 7/2012 | Pavlov et al. |
| 2012/0197844 A1 | 8/2012 | Wang et al. |
| 2012/0221828 A1 | 8/2012 | Fang et al. |
| 2012/0239869 A1 | 9/2012 | Chiueh et al. |
| 2012/0243687 A1 | 9/2012 | Li et al. |
| 2012/0246129 A1 | 9/2012 | Rothschild et al. |
| 2012/0246392 A1 | 9/2012 | Cheon |
| 2012/0290788 A1 | 11/2012 | Klemm et al. |
| 2012/0303876 A1 | 11/2012 | Benhase et al. |
| 2012/0310890 A1 | 12/2012 | Dodd et al. |
| 2012/0311246 A1 | 12/2012 | McWilliams et al. |
| 2012/0311290 A1 | 12/2012 | White |
| 2012/0317084 A1 | 12/2012 | Liu |
| 2012/0317338 A1 | 12/2012 | Yi et al. |
| 2012/0317353 A1 | 12/2012 | Webman et al. |
| 2012/0317395 A1 | 12/2012 | Segev et al. |
| 2012/0323860 A1* | 12/2012 | Yasa ................ G06F 17/30156 707/692 |
| 2012/0324150 A1 | 12/2012 | Moshayedi et al. |
| 2013/0007097 A1 | 1/2013 | Sambe et al. |
| 2013/0010966 A1 | 1/2013 | Li et al. |
| 2013/0013654 A1 | 1/2013 | Lacapra et al. |
| 2013/0018854 A1 | 1/2013 | Condict |
| 2013/0019057 A1 | 1/2013 | Stephens |
| 2013/0042065 A1 | 2/2013 | Kasten et al. |
| 2013/0060992 A1 | 3/2013 | Cho et al. |
| 2013/0073519 A1 | 3/2013 | Lewis et al. |
| 2013/0073821 A1 | 3/2013 | Flynn et al. |
| 2013/0080679 A1 | 3/2013 | Bert |
| 2013/0086006 A1 | 4/2013 | Colgrove et al. |
| 2013/0086270 A1 | 4/2013 | Nishikawa et al. |
| 2013/0110783 A1 | 5/2013 | Wertheimer et al. |
| 2013/0110845 A1 | 5/2013 | Dua |
| 2013/0124776 A1 | 5/2013 | Hallak et al. |
| 2013/0138616 A1 | 5/2013 | Gupta et al. |
| 2013/0138862 A1 | 5/2013 | Motwani et al. |
| 2013/0166724 A1 | 6/2013 | Bairavasundaram et al. |
| 2013/0166727 A1 | 6/2013 | Wright et al. |
| 2013/0166861 A1 | 6/2013 | Takano et al. |
| 2013/0185719 A1 | 7/2013 | Kar et al. |
| 2013/0204902 A1* | 8/2013 | Wang ................ G06F 17/30371 707/797 |
| 2013/0219048 A1 | 8/2013 | Arvidsson et al. |
| 2013/0226877 A1 | 8/2013 | Nagai et al. |
| 2013/0227111 A1 | 8/2013 | Wright et al. |
| 2013/0227195 A1 | 8/2013 | Beaverson et al. |
| 2013/0227201 A1 | 8/2013 | Talagala et al. |
| 2013/0227236 A1 | 8/2013 | Flynn et al. |
| 2013/0232261 A1 | 9/2013 | Wright et al. |
| 2013/0238832 A1 | 9/2013 | Dronamraju et al. |
| 2013/0238876 A1 | 9/2013 | Fiske et al. |
| 2013/0238932 A1 | 9/2013 | Resch |
| 2013/0262805 A1 | 10/2013 | Zheng et al. |
| 2013/0268497 A1 | 10/2013 | Baldwin et al. |
| 2013/0275656 A1 | 10/2013 | Talagala et al. |
| 2013/0290263 A1 | 10/2013 | Beaverson et al. |
| 2013/0305002 A1 | 11/2013 | Hallak et al. |
| 2013/0311740 A1 | 11/2013 | Watanabe et al. |
| 2013/0332688 A1 | 12/2013 | Corbett et al. |
| 2013/0346700 A1 | 12/2013 | Tomlinson et al. |
| 2013/0346720 A1 | 12/2013 | Colgrove et al. |
| 2013/0346810 A1 | 12/2013 | Kimmel et al. |
| 2014/0006353 A1 | 1/2014 | Chen et al. |
| 2014/0013068 A1 | 1/2014 | Yamato et al. |
| 2014/0052764 A1 | 2/2014 | Michael et al. |
| 2014/0068184 A1 | 3/2014 | Edwards et al. |
| 2014/0082255 A1 | 3/2014 | Powell |
| 2014/0082273 A1 | 3/2014 | Segev |
| 2014/0089264 A1* | 3/2014 | Talagala ............ G06F 11/1471 707/649 |
| 2014/0089683 A1 | 3/2014 | Miller et al. |
| 2014/0095758 A1 | 4/2014 | Smith et al. |
| 2014/0101115 A1 | 4/2014 | Ko et al. |
| 2014/0108350 A1 | 4/2014 | Marsden |
| 2014/0108797 A1 | 4/2014 | Johnson et al. |
| 2014/0143207 A1* | 5/2014 | Brewer ............ G06F 17/30575 707/634 |
| 2014/0149647 A1 | 5/2014 | Guo et al. |
| 2014/0172811 A1 | 6/2014 | Green |
| 2014/0181370 A1 | 6/2014 | Cohen et al. |
| 2014/0185615 A1 | 7/2014 | Ayoub et al. |
| 2014/0195480 A1 | 7/2014 | Talagala et al. |
| 2014/0195564 A1 | 7/2014 | Talagala et al. |
| 2014/0208003 A1 | 7/2014 | Cohen et al. |
| 2014/0215129 A1 | 7/2014 | Kuzmin et al. |
| 2014/0215170 A1 | 7/2014 | Scarpino et al. |
| 2014/0244962 A1 | 8/2014 | Arges et al. |
| 2014/0258681 A1 | 9/2014 | Prasky et al. |
| 2014/0279917 A1 | 9/2014 | Minh et al. |
| 2014/0279931 A1 | 9/2014 | Gupta et al. |
| 2014/0281055 A1 | 9/2014 | Davda et al. |
| 2014/0297980 A1 | 10/2014 | Yamazaki |
| 2014/0310231 A1 | 10/2014 | Sampathkumaran et al. |
| 2014/0310373 A1 | 10/2014 | Aviles et al. |
| 2014/0325117 A1 | 10/2014 | Canepa et al. |
| 2014/0325147 A1 | 10/2014 | Nayak |
| 2014/0344222 A1 | 11/2014 | Morris et al. |
| 2014/0379965 A1 | 12/2014 | Gole et al. |
| 2015/0019792 A1 | 1/2015 | Swanson et al. |
| 2015/0032928 A1 | 1/2015 | Andrews et al. |
| 2015/0058577 A1 | 2/2015 | Earl |
| 2015/0066852 A1 | 3/2015 | Beard et al. |
| 2015/0085665 A1 | 3/2015 | Kompella et al. |
| 2015/0085695 A1 | 3/2015 | Ryckbosch et al. |
| 2015/0089138 A1 | 3/2015 | Tao et al. |
| 2015/0095555 A1 | 4/2015 | Asnaashari et al. |
| 2015/0106556 A1 | 4/2015 | Yu et al. |
| 2015/0112939 A1 | 4/2015 | Cantwell et al. |
| 2015/0120754 A1 | 4/2015 | Chase et al. |
| 2015/0127922 A1 | 5/2015 | Camp et al. |
| 2015/0134926 A1 | 5/2015 | Yang et al. |
| 2015/0193338 A1 | 7/2015 | Sundaram et al. |
| 2015/0205663 A1 | 7/2015 | Sundaram et al. |
| 2015/0220402 A1 | 8/2015 | Cantwell et al. |
| 2015/0242478 A1 | 8/2015 | Cantwell et al. |
| 2015/0244795 A1 | 8/2015 | Cantwell et al. |
| 2015/0261446 A1 | 9/2015 | Lee |
| 2015/0269201 A1* | 9/2015 | Caso ................ G06F 17/30233 707/641 |
| 2015/0286438 A1 | 10/2015 | Simionescu et al. |
| 2015/0324264 A1 | 11/2015 | Chinnakkonda et al. |
| 2015/0339194 A1 | 11/2015 | Kalos et al. |
| 2015/0378613 A1 | 12/2015 | Koseki |
| 2016/0070480 A1 | 3/2016 | Babu et al. |
| 2016/0070618 A1 | 3/2016 | Pundir et al. |
| 2016/0070644 A1 | 3/2016 | D'Sa et al. |
| 2016/0070714 A1 | 3/2016 | D'Sa et al. |
| 2016/0077744 A1 | 3/2016 | Pundir et al. |

(56) References Cited

U.S. PATENT DOCUMENTS

| | | | |
|---|---|---|---|
| 2016/0139838 | A1 | 5/2016 | D'Sa et al. |
| 2016/0179410 | A1 | 6/2016 | Haas et al. |
| 2016/0248583 | A1 | 8/2016 | McClanahan et al. |

FOREIGN PATENT DOCUMENTS

| | | |
|---|---|---|
| EP | 2693358 A1 | 2/2014 |
| EP | 2735978 A1 | 5/2014 |
| WO | WO-2006050455 A2 | 5/2006 |
| WO | WO-2012132943 A1 | 10/2012 |

OTHER PUBLICATIONS

Art S. Kagel, "two-way merge sort", Dictionary of Algorithms and Data Structures [online], May 2005 [retrieved on Jan. 28, 2015]. Retrieved from the Internet< URL: http://xlinux.nist.gov/dads/HTMUtwowaymrgsrt.html>, 1 page.
Patrick O'Neil, Edward Cheng, Dieter Gawlick, and Elizabeth O'Neil. The log-structured merge-tree (LSM-tree). Acta Informatica33. pp. 351-385. 1996.
Agrawal, et al., "Design Tradeoffs for SSD Performance," USENIX Annual Technical Conference, 2008, 14 Pages.
Alvaraez C., "NetApp Deduplication for FAS and V-Series Deployment and Implementation Guide," Technical Report TR-3505, 2011, 71 pages.
Amit et al., "Strategies for Mitigating the IOTLB Bottleneck," Technion—Israel Institute of Technology, IBM Research Haifa, WIOSCA 2010- Sixth Annual Workshop on the Interaction between Operating Systems and Computer Architecture, 2010, 12 pages.
Arpaci-Dusseau R., et al., "Log-Structured File Systems," Operating Systems: Three Easy Pieces published by Arpaci-Dusseau Books, May 25, 2014, 15 pages.
Balakrishnan M., et al., "CORFU: A Shared Log Design for Flash Clusters," Microsoft Research Silicon Vally, University of California, San Diego, Apr. 2012, https://www.usenix.org/conference/nsdi12/technical-sessions/presentation/balakrishnan, 14 pages.
Ben-Yehuda et al., "The Price of Safety: Evaluating IOMMU Performance," Proceedings of the Linux Symposium, vol. 1, Jun. 27-30, 2007, pp. 9-20.
Bogaerdt, "cdeftutorial," http://oss.oetiker.ch/rrdtool/tut/cdeftutorial.en.html Date obtained from the internet, Sep. 9, 2014, 14 pages.
Bogaerdt, "Rates, Normalizing and Consolidating," http://www.vandenbogaerdl.nl/rrdtool/process.php Date obtained from the internet: Sep. 9, 2014, 5 pages.
Bogaerdt, "rrdtutorial," http://oss.oetiker.ch/rrdtool/lul/rrdtutorial.en.html Date obtained from the internet, Sep. 9, 2014, 21 pages.
Chris K., et al., "How many primes are there?" Nov. 2001. https://web.archive.org/web/20011120073053/http://primes.utm.edu/howmany.shtml.
Cornwellm., "Anatomy of a Solid-state Drive," ACM Queue-Networks, Oct. 2012, vol. 10 (10), pp. 1-7.
Culik K., et al., "Dense Multiway Trees," ACM Transactions on Database Systems, Sep. 1981, vol. 6 (3), pp. 486-512.
Debnath B., et al., "FlashStore: High Throughput Persistent Key-Value Store," Proceedings of the VLDB Endowment VLDB Endowment, Sep. 2010, vol. 3 (1-2), pp. 1414-1425.
Debnath, et al., "ChunkStash: Speeding up in line Storage Deduplication using Flash Memory," USENIX, USENIXATC '10, Jun. 2010, 15 pages.
Fan, et al., "MemC3: Compact and Concurrent MemCache with Dumber Caching and Smarter Hashing," USENIX NSDI '13, Apr. 2013, pp. 371-384.
Final Office Action mailed Dec. 2, 2015, for U.S. Appl. No. 14/684,956, filed Apr. 13, 2015, 12 pages.
Final Office Action mailed Dec. 22, 2015, for U.S. Appl. No. 13/857,008, filed Apr. 4, 2013, 10 pages.
Final Office Action mailed Dec. 4, 2013, for U.S. Appl. No. 13/856,997, filed Apr. 4, 2013, 25 pages.
Final Office Action mailed Dec. 4, 2015, for U.S. Appl. No. 14/454,197, filed Aug. 7, 2014, 11 pages.
Final Office Action mailed Feb. 16, 2016, for U.S. Appl. No. 14/186,847, filed Feb. 21, 2014, 25 pages.
Final Office Action mailed Feb. 2, 2016, for U.S. Appl. No. 13/856,958, filed Apr. 4, 2013, 18 pages.
Final Office Action mailed Feb. 6 2014, for U.S. Appl. No. 13/856,958, filed Apr. 4, 2013, 16 pages.
Final Office Action mailed Mar. 2, 2016 for U.S. Appl. No. 14/701,832, filed May 1, 2015, 16 pages.
Final Office Action mailed May 13, 2013, for U.S. Appl. No. 13/041,122, filed Mar. 4, 2011, 22 pages.
Final Office Action mailed Nov. 25. 2015, for U.S. Appl. No. 14/684,966, filed Apr. 13, 2015, 21 pages.
Gal E., et al., "Algorithms and Data Structures for Flash Memories," ACM Computing Surveys (CSUR) Archive, Publisher ACM, New York City, NY, USA, Jun. 2005, vol. 37 (2), pp. 138-163.
Gray J., et al., "Flash Disk Opportunity for Server Applications," Queue- Enterprise Flash Storage, Jul.-Aug. 2008, vol. 6 (4), pp. 18-23.
Gulati et al., "BASIL: Automated IO Load Balancing Across Storage Devices," Proceedings of the 8th USENIX Conference on File and Storage Technologies, Fastio, Berkeley, CA, USA, 2010, 14 pages.
Handy J., "SSSI Tech Notes: How Controllers Maximize SSD Life," SNIA, Jan. 2013, pp. 1-20.
Hwang K., et al., "RAID-x: A New Distributed Disk Array for I/O-centric Cluster Computing," IEEE High-Performance Distributed Computing, Aug. 2000, pp. 279-286.
International Search Report and Written Opinion for Application No. PCT/EP2014/071446 mailed on Apr. 1, 2015, 14 pages.
International Search Report and Written Opinion for Application No. PCT/US2012/071844 mailed Mar. 1, 2013, 12 pages.
International Search Report and Written Opinion for Application No. PCT/US2014/035284 mailed on Apr. 1, 2015, 8 pages.
International Search Report and Written Opinion for Application No. PCT/US2014/055138 mailed on Dec. 12, 2014, 13 pages.
International Search Report and Written Opinion for Application No. PCT/US2014/058728 mailed on Dec. 16, 2014, 11 pages.
International Search Report and Written Opinion for Application No. PCT/US2014/060031 mailed on Jan. 26, 2015, 9 pages.
International Search Report and Written Opinion for Application No. PCT/US2014/071446 mailed on Apr. 1, 2015, 13 pages.
International Search Report and Written Opinion for Application No. PCT/US2014/071465 mailed on Mar. 25, 2015, 12 pages.
International Search Report and Written Opinion for Application No. PCT/US2014/071484 mailed on Mar. 25, 2015, 9 pages.
International Search Report and Written Opinion for Application No. PCT/US2014/071581 mailed on Apr. 10, 2015, 9 pages.
Lamport L., "The Part-Time Parliament," ACM Transactions on Computer Systems, May 1998, vol. 16 (2), pp. 133-169.
Leventhal A.H., "A File System All its Own," Communications of the ACM Queue, May 2013, vol. 56 (5), pp. 64-67.
Lim H., et al., "SILT: A Memory-Efficient, High-Performance Key-Value Store," Proceedings of the 23rd ACM Symposium on Operating Systems Principles (SOSP'11), Oct. 23-26, 2011, pp. 1-13.
Metreveli et al. "CPHash: A Cache-Partitioned Hash Table." Nov. 2011. https://people.csail.mit.edu/nickolai/papers/metrevelicphash-tr.pdf.
Moshayedi M., et al., "Enterprise SSDs," ACM Queue- Enterprise Flash Storage, Jul.-Aug. 2008, vol. 6 (4), pp. 32-39.
Non-Final Office Action mailed Aug. 12, 2015, for U.S. Appl. No. 14/684,929, filed Apr. 13, 2015, 20 pages.
Non-Final Office Action mailed Aug. 13, 2015, for U.S. Appl. No. 13/856,958, filed Apr. 4, 2013, 15 pages.
Non-Final Office Action mailed Aug. 13, 2015, for U.S. Appl. No. 14/186,847, filed Feb. 21, 2014, 20 pages.
Non-Final Office Action mailed Aug. 21, 2013, for U.S. Appl. No. 13/856,997, filed Apr. 4, 2013, 19 pages.
Non-Final Office Action mailed Aug. 7, 2015, for U.S. Appl. No. 14/684,894, filed Apr. 13, 2015, 10 pages.

(56) References Cited

OTHER PUBLICATIONS

Non-Final Office Action mailed Dec. 5, 2012, for U.S. Appl. No. 13/041,122, filed Mar. 4, 2011, 21 pages.
Non-Final Office Action mailed Jan. 29, 2016, for U.S. Appl. No. 14/454,197, filed Aug. 7, 2014, 11 pages.
Non-Final Office Action mailed Jul. 1, 2015, for U.S. Appl. No. 13/857,008, filed Apr. 4, 2013, 10 pages.
Non-Final Office Action mailed Jul. 14, 2015, for U.S. Appl. No. 14/454,197, filed Aug. 7, 2014, 5 pages.
Non-Final Office Action mailed Jul. 14, 2015, for U.S. Appl. No. 14/684,956, filed Apr. 13, 2015, 5 pages.
Non-Final Office Action mailed Jul. 14. 2015, for U.S. Appl. No. 14/684,966, filed Apr. 13, 2015, 21 pages.
Non-Final Office Action mailed Jul. 29, 2015, for U.S. Appl. No. 14/292,089, filed May 30, 2014, 4 pages.
Non-Final Office Action mailed Jul. 31, 2013, for U.S. Appl. No. 13/856,958, filed Apr. 4, 2013, 15 pages.
Non-Final Office Action mailed Jul. 31, 2015 for U.S. Appl. No. 14/259,467, filed Apr. 23, 2014, 10 pages.
Non-Final Office Action mailed Jul. 31, 2015, for U.S. Appl. No. 14/684,942, filed Apr. 13, 2015, 4 pages.
Non-Final Office Action mailed Jun. 17, 2013, for U.S. Appl. No. 13/041,095, filed Mar. 4, 2011, 10 pages.
Non-Final Office Action mailed Jun. 30, 2015, for U.S. Appl. No. 14/057,145, filed Oct. 18, 2015, 21 pages.
Non-Final Office Action mailed Mar. 31, 2016, for U.S. Appl. No. 14/941,938.
Non-Final Office Action mailed Oct. 19, 2015, for U.S. Appl. No. 14/701,832, filed May 1, 2015, 11 pages.
Non-Final Office Action mailed on Jan. 26, 2016 for U.S. Appl. No. 14/932,063, filed Nov. 4, 2015, 9 pages.
Non-Final Office Action mailed Sep. 10, 2014, for U.S. Appl. No. 13/338,039, filed Dec. 27, 2011, 10 pages.
Notice Allowance mailed Jan. 21, 2016, for U.S. Appl. No. 14/684,894, filed Apr. 13, 2015, 13 pages.
Notice of Allowance mailed Apr. 14, 2015, for U.S. Appl. No. 13/856,997, filed Apr. 4, 2013, 18 pages.
Notice of Allowance mailed Apr. 24, 2014, for U.S. Appl. No. 13/041,122, filed Mar. 4, 2011, 14 pages.
Notice of Allowance mailed Aug. 24, 2016, for U.S. Appl. No. 14/684,956, filed Apr. 13, 2015, 4 pages.
Notice of Allowance mailed Aug. 27, 2015 for U.S. Appl. No. 14/684,914, filed Apr. 13, 2015, 10 pages.
Notice of Allowance mailed Dec. 8, 2014, for U.S. Appl. No. 13/338,039, filed Dec. 27, 2011, 7 pages.
Notice of Allowance mailed Feb. 22, 2016, for U.S. Appl. No. 14/057,145, filed Oct. 18, 2015, 12 pages.
Notice of Allowance mailed Mar. 29, 2016, for U.S. Appl. No. 14/454,197, filed Aug. 7, 2014, 7 pages.
Notice of Allowance mailed May 4, 2016 for U.S. Appl. No. 14/932,063, filed Nov. 4, 2015, 7 pages.
Notice of Allowance mailed Oct. 9, 2013, for U.S. Appl. No. 13/041,095, filed Mar. 4, 2011, 7 pages.
Oetiker, "rrdfetch," http ://oss.oetiker.ch/rrdtool/doc/rrdfetch .en.html, Date obtained from the internet: Sep. 9, 2014, 5 pages.
Oetiker, "rrdtool," http :/loss. oetiker.ch/rrdtool/doc/rrdtool.en. html Date obtained from the internet: Sep. 9, 2014, 5 pages.
Ongaro D., et al., "In Search of an Understandable Consensus Algorithm," Stanford University, URL: https://ramcloud.stanford.edu/wiki/download/attachments/11370504/raft.pdf, May 2013, 14 pages.
Ongaro, et al., "In search of an understandable consensus algorithm (extended version)," 2014, 18 pages.
Pagh R., et al., "Cuckoo Hashing," Elsevier Science, Dec. 8, 2003, pp. 1-27.
Pagh R., et al., "Cuckoo Hashing for Undergraduates," IT University of Copenhagen, Mar. 27, 2006, pp. 1-6.
Proceedings of the FAST 2002 Conference on File Storage Technologies, Monterey, California, USA, Jan. 28-30, 2002, 14 pages.
Rosenblum M., et al., "The Design and Implementation of a Log-Structured File System," In Proceedings of ACM Transactions on Computer Systems, vol. 10(1),Feb. 1992, pp. 26-52.
Rosenblum M., et al., "The Design and Implementation of a Log-Structured File System," (SUN00006867-SUN00006881), Jul. 1991, 15 pages.
Rosenblum M., et al., "The Design and Implementation of a Log-Structured File System,"Proceedings of the 13th ACM Symposium on Operating Systems Principles, (SUN00007382-SUN00007396), Jul. 1991, 15 pages.
Rosenblum M., et al., "The LFS Storage Manager," USENIX Technical Conference, Anaheim, CA, (Sun 00007397-SUN00007412), Jun. 1990, 16 pages.
Rosenblum M., et al., "The LFS Storage Manager," USENIX Technical Conference, Computer Science Division, Electrical Engin. and Computer Sciences, Anaheim, CA, presented at Summer '90 USENIX Technical Conference, (SUN00006851 - SUN00006866), Jun. 1990, 16 pages.
Rosenblum M., "The Design and Implementation of a Log-Structured File System," UC Berkeley,1992, pp. 1-101.
Sears., et al., "Blsm: A General Purpose Log Structured Merge Tree," Proceedings of the 2012 ACM SIGMOD International Conference on Management, 2012, 12 pages.
Seltzer M., et al., "An Implementation of a Log Structured File System for UNIX," Winter USENIX, San Diego, CA, Jan. 25-29, 1993, pp. 1-18.
Seltzer M.I., et al., "File System Performance and Transaction Support," University of California at Berkeley Dissertation, 1992, 131 pages.
Smith K., "Garbage Collection," Sand Force, Flash Memory Summit, Santa Clara, CA, Aug. 2011, pp. 1-9.
Stoica et al. "Chord: A Scalable Peer-to-peer Lookup Service for Internet Applications." Aug. 2001. ACM. SIGCOMM '01.
Supplementary European Search Report for Application No. EP12863372 mailed on Jul. 16, 2015, 7 pages.
Texas Instruments, User Guide, TMS320C674x/OMAP-L1 x Processor Serial ATA (SATA) Controller, Mar. 2011, 76 Pages.
Twigg A., et al., "Stratified B-trees and Versioned Dictionaries," Proceedings of the 3rd US EN IX Conference on Hot Topics in Storage and File Systems, 2011, vol. 11, pp. 1-5.
Wikipedia, "Cuckoo hashing," http://en.wikipedia.org/wiki/Cuckoo_hash, Apr. 2013, pp. 1-5.
Wilkes J., et al., "The Hp Auto Raid Hierarchical Storage System," Operating System Review, ACM, New York, NY, Dec. 1, 1995, vol. 29 (5), pp. 96-108.
Wu P-L., et al., "A File-System-Aware FTL Design for Flash-Memory Storage Systems," IEEE, Design, Automation & Test in Europe Conference & Exhibition, 2009, pp. 1-6.

\* cited by examiner

SYSTEM PERFORMING DATA DEDUPLICATION USING A DENSE TREE DATA STRUCTURE

BACKGROUND OF THE INVENTION

Field of the Invention

The present invention relates to storage systems and, more specifically, to a technique for efficiently reducing duplicate data in a storage system.

Background Information

A storage system typically includes one or more storage devise into which information may be entered, and from which information may be obtained, or desired. The storage system may logically organize the information stored on the devices as storage containers, such as logical units or files. These storage containers may be accessed by a host system using a protocol over a network connecting the storage system to the host.

The storage system may typically retain a plurality of copies of similar data (e.g., duplicate data). Duplication of data may occur when, for example, two or more files store common data or where data is stored at multiple locations within a file. The storage of such duplicate data increases the total consumption of storage space utilized by the storage system and may cause administrators to expand the physical storage space available for use by the system, thereby increasing costs to maintain the storage system. As such, data deduplication techniques may be implemented to save storage space and reduce costs.

A prior technique for data deduplication utilizes a fingerprint database that is implemented as a flat file storing a list of fingerprints as an array, wherein each element of the array is a fingerprint entry. A fingerprint may be, for example, a hash or checksum value of a fixed size block of data (e.g., 4 kilobytes). The array is then utilized to perform data deduplication operations. Specifically, the fingerprint database is traversed entirely, from beginning to end, and existing fingerprints stored in the database are compared with a batch of new fingerprints associated with new blocks of data. A merge-sort operation may then be performed to identify duplicate fingerprints and remove duplicate data.

A disadvantage associated with the above technique is that there may be substantial overhead (e.g., reading and writing) associated with performing the deduplication operations. Specifically, for each deduplication operation, the entire existing fingerprint database is read from beginning to end, and at the completion of the deduplication operations, the entire fingerprint database (e.g., flat file) is overwritten. Additionally, since the database is embodied as a flat file, there is typically no means (e.g., no data structure) to facilitate lookup operations within the file. Therefore, the deduplication operations are essentially implemented as operations that do not have a means to perform indexing on the fingerprint database.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

DESCRIPTION OF ILLUSTRATIVE EMBODIMENTS

The embodiments described herein are directed to employing a dense tree data structure to perform data deduplication in a storage system. The dense tree data structure may be embodied as multiple levels of a search structure with possibly overlapping entries at each level. In an embodiment, the dense tree data structure may be employed to perform post processing data deduplication. Specifically, as new blocks of data are written to storage devices of the storage system, fingerprints are generated for those new blocks and the fingerprints are inserted as entries into a top level/level 0 (L0) of the dense tree data structure. When L0 is filled, the contents from L0 may be merged with level 1 (L1) in accordance with a merge technique configured to merge fingerprint entries of L0 with entries of L1. For example, when L0 is filled, all of the fingerprint entries may be copied from L0 to L1, with respect to an initial merge operation. After the initial merge from L0 to L1, new fingerprints are added to L0 until L0 fills up again, which triggers a new merge operation from L0 to L1. Illustratively, a lower level of the dense tree data structure has a higher storage capacity than that of a higher level of the structure. In response to the new merge operation, duplicate fingerprints in L0 and L1 are identified which, in turn, indicates duplicate data blocks stored on the storage devices of the storage system. A post processing deduplication operation is then performed to remove duplicate data blocks on the storage devices corresponding to the duplicate fingerprint entries that are identified. A similar deduplication operation may be performed in response to a subsequent merge operation between L1 and level 2 (L2). In sum, the dense tree data structure may be employed to facilitate efficient data deduplication when merging content from a higher level to a lower level of the data structure.

In an embodiment, in line deduplication utilizing the dense tree data structure may be performed. The dense tree data structure is illustratively organized as a B-tree configured to maintain sorted data and allows searches, sequential access, insertions, and deletions with respect to that data in logarithmic time. For example, as new fingerprint entries are loaded into L0, those new fingerprints may be compared with existing fingerprints loaded into L0 and/or other lower levels to facilitate inline deduplication to identify duplicate fingerprints and subsequently perform the deduplication operation.

Advantageously, use of the dense tree data structure minimizes the amount of read and write operations used in the deduplication operation. In addition, because it is organized as multiple levels, the dense tree data structure facilitates a degree of lookup that leverages the indexing capability of the dense tree data structure to allow searching for duplicate fingerprints in real or substantially real time.

DESCRIPTION

Figure 1:
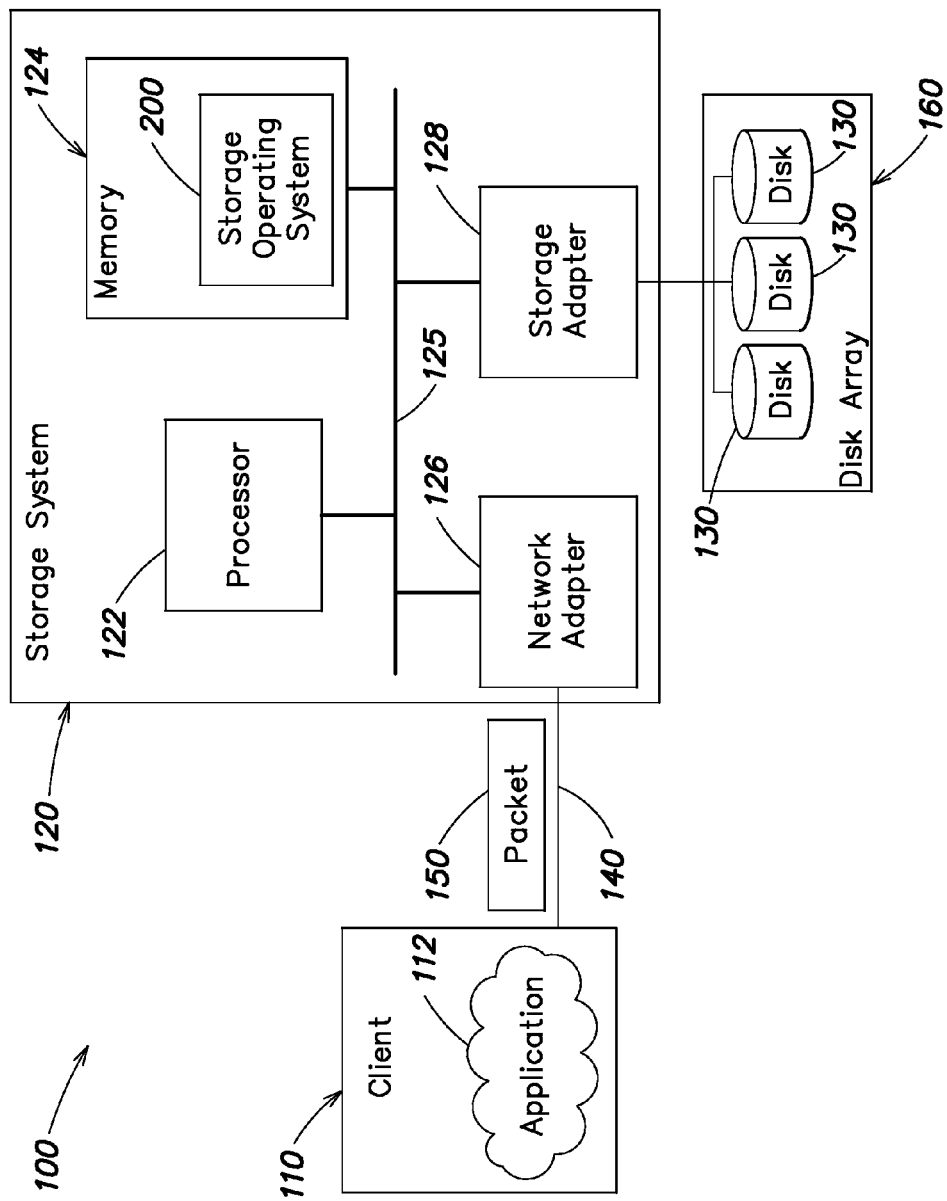
FIG. 1 is a schematic block diagram of storage system environment.

FIG. 1 is a schematic block diagram of a storage system environment 100 including a storage system 120 that may be advantageously used with the embodiment described herein. The storage system is illustratively a computer that provides storage service relating to the organization of information on storage devices, such as disks 130 of a disk array 160. The storage system 120 includes a processor 122, a memory 124, a network adapter 126, and a storage adapter 128 interconnected by a system bus 125. The storage system 120 also includes a storage operating system 200 that illustratively implements a high-level module, such as a file system, to logically organize the information as a hierarchical structure of named storage containers, such as directories, files, and special types of files called virtual disks (hereinafter "blocks") on the disks.

In an embodiment, the memory 124 includes memory locations that are addressable by the processor 122 and adapters for storing software programs and/or processes and data structures associated with embodiments discussed herein. The processors and adapters may include processing elements and/or logic circuitry configured to execute the software programs/processes and manipulate the data structures, such as a dense tree structure, or portions thereof, as described below. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the embodiments described herein. It is also expressly contemplated that the various software programs, processors and layers described herein may be embodied as modules configured to operate in accordance with the disclosure, e.g., according to the functionality of a software program, process or layer.

The network adapter 126 comprises the mechanical, electrical and signaling circuitry needed to connect the storage system 120 to a client 110 over a computer network 140, which may include one or more point-to-point connections or a shared medium, such as a local area network. Illustratively, the computer network 140 may be embodied as an Ethernet network or a Fibre Channel (FC) network. The client 110 may communicate with the storage system over network 140 by exchanging discrete frames or packets 150 of data according to pre-defined protocols, such as the Transmission Control Protocol/Internet Protocol (TCP/IP).

The client 110 may be a general-purpose computer configured to execute applications 112. Moreover, the client 110 may interact with the storage system 120 in accordance with a client/server model of information delivery. That is, the client 110 may request the services of the storage system 120, and the system may return the results of the services requested by the client 110, by exchanging packets 150 over the network 140. The client 110 may issue packets including file-based access protocols, such as the Common Internet File System (CIFS) protocol or Network File System (NFS) protocol, over TCP/IP when accessing information in the form of storage containers, such as files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of storage containers, such as blocks.

The storage adapter 128 may cooperate with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on disks 130, such as hard disk drives (HDDs) and/or direct access storage devices (DASDs), of array 160. The storage adapter 128 includes input/output (I/O) interface circuitry that couples to the disks 130 over an I/O interconnect arrangement, such as a conventional high-performance, FC serial link topology.

Storage of information on array 160 may be implemented as one or more storage "volumes" that include a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID), managed according to a RAID protocol. Most RAID implementations, such as a RAID-4 level implementation, enhance the reliability/integrity of data storage through the redundant writing of data "stripes" across a given number of physical disks in the RAID group, and the appropriate storing of parity information with respect to the striped data. The illustrative RAID protocol also implements a 32-bit checksum value for each block of data written to disk, to verify data integrity. The illustrative example of a RAID implementation is a RAID-4 level implementation, although it should be understood that other types and levels of RAID implementations may be used in accordance with the embodiments described herein. Likewise, other implementations and/or protocols may be used to organize the disks of the logical volume/file system.

To facilitate access to the disks 130, the storage operating system 200 implements a write-anywhere file system that cooperates with virtualization modules to "virtualize" the storage space provided by disks 130. Illustratively, the file system logically organizes the information as a hierarchical structure of named storage containers, such as directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of storage containers, such as blocks on the disks that are exported as named logical unit numbers (luns).

In an embodiment, the storage operating system is illustratively the NetApp® Data ONTAP® operating system available from Network Appliance, Inc., Sunnyvale, Calif., that implements a Write Anywhere File Layout (WAFL®) file system. However, it is expressly contemplated that any appropriate storage operating system may be enhanced for use in accordance with the embodiments described herein. As such, where the term "Data ONTAP" is employed, it should be taken broadly to refer to any storage operating system that is otherwise adaptable to the embodiments herein.

Figure 2:
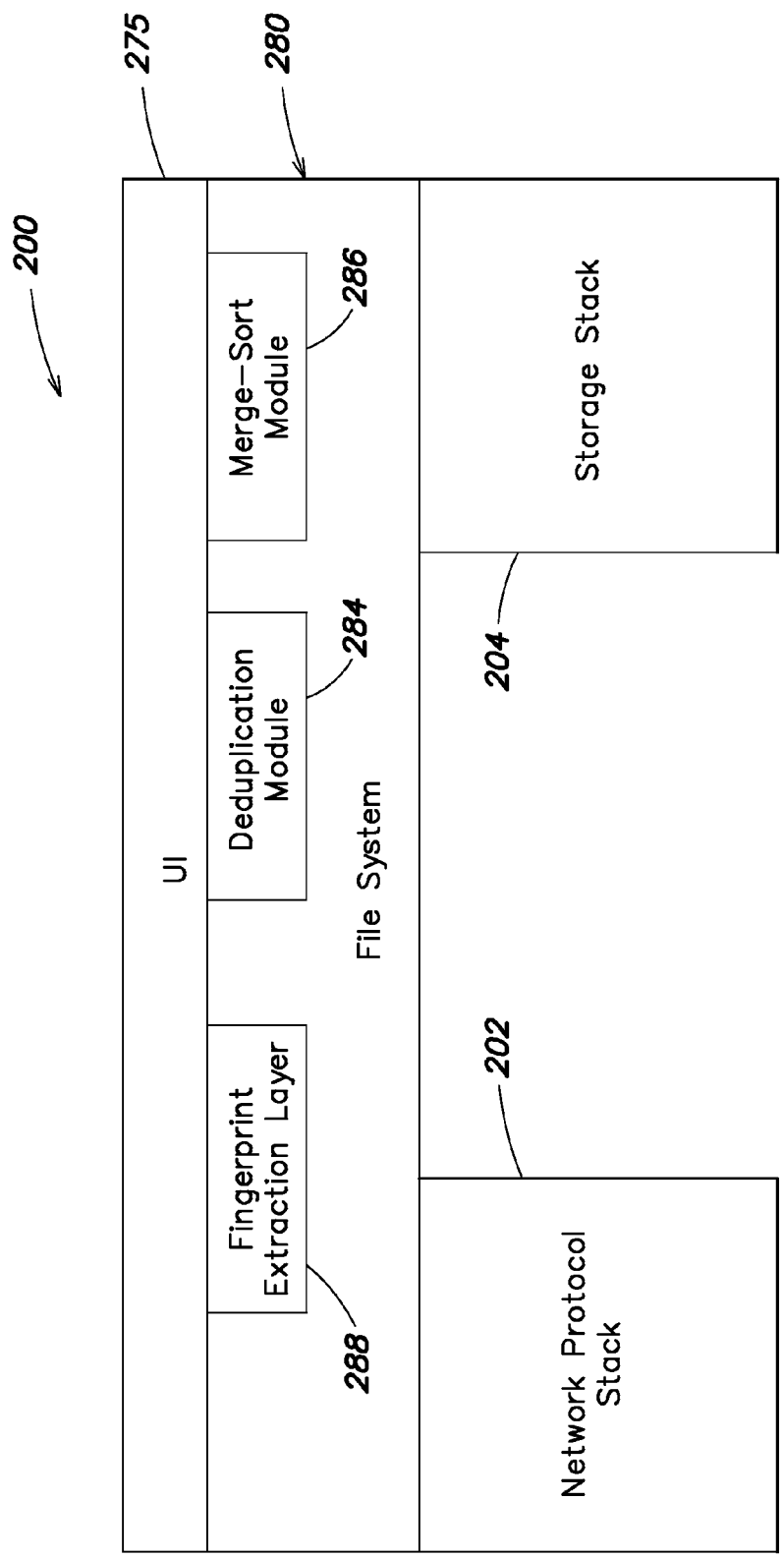
FIG. 2 is a schematic block diagram of a storage operating system.

FIG. 2 is a schematic block diagram of a storage operating system 200 that may be advantageously used with the embodiments described herein. The storage operating system includes a series of software layers organized to form an integrated network protocol stack 202 or, more generally, a multi-protocol engine that provides data paths for clients to access information stored on the storage system using block and file access protocols. In addition, the storage operating system includes a storage stack 204 that includes storage modules that implements a storage (e.g., RAID) protocol and manages the storage and retrieval of information to and from the volumes/disks in accordance with I/O operations. Bridging the storage stack 204 with the integrated network protocol stack 202 is a virtualization system that is implemented by a file system 280 that enables access by administrative interfaces, such as a user interface (UI) 275, in response to a user (system administrator) issuing commands to the storage system. The UI 275 is disposed over the storage operating system in a manner that enables administrative or user access to the various layers and systems.

According to an embodiment, the storage operating system 200 further includes a fingerprint extraction layer 288, a merge-sort module 286, and a deduplication module 284 that may communicate with each other using message passing such as Inter-Process Communication (IPC), as known by those skilled in the art. The fingerprint extraction layer 288 may generate a fingerprint, for one or more block of data, that may be inserted into the dense tree data structure 1000, as described below. The merge-sort module 286 and the deduplication module 284 may execute a data duplication process periodically, for example, in response to a command from an administrator or user, through the UI 275. Specifically, and in response to a command received through UI 275, the merge-sort module 286 may identify duplicate fingerprint entries in the dense tree data structure 1000. The merge-sort module 286 may then communicate information, associated with the duplicate fingerprint entries, to the deduplication module 284, which may then identify and remove duplicate data blocks stored on disk 130 that correspond to the identified duplicate fingerprints. The data deduplication procedure, implemented by the deduplication module 284, may modify pointers within indirect blocks to point to a single data block instead of multiple data blocks containing identical data as described in U.S. patent application Ser. No. 11/105,895, filed on Apr. 13, 2005, entitled METHOD AND APPARATUS FOR IDENTIFYING AND ELIMINATING DUPLICATE DATA BLOCKS AND SHARING DATA BLOCKS IN A STORAGE SYSTEM, the contents of which are hereby incorporated by reference in its entirety.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements a write-anywhere file system (such as the WAFL® file system available from Network Appliance, Inc., Sunnyvale, Calif.) having an on-disk format representation that is block-based using, e.g., 4 kilobyte (KB) blocks and using index nodes ("inodes") to identify files and file attributes (such as creation time, access permissions, size, and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (FS) info block specifies the layout of information in the file system and includes an inode of a file that includes all other inodes of the file system. Each logical volume (file system) has an FS info block that is preferably stored at a fixed location within, e.g., a RAID group. The inode of the inode file may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a read request from the client 110 is forwarded as a packet 150 over the computer network 140 and onto the storage system 120 where it is received at the network adapter 126. A network driver processes the packet and, if appropriate, passes it on to a network protocol and file access layer for additional processing prior to forwarding to the write-anywhere file system 280. Here, the file system generates operations to load (retrieve) the requested data from disk 130 if it is not resident in memory, for example. If the information is not in the memory, the file system 280 indexes into the inode file using the inode number to access an appropriate entry and retrieve a logical vbn that may be mapped to a disk identifier and disk block number (disk, dbn) and sent. The dbn is accessed from specified disk 130 and loads the requested data block(s) in memory for processing by the storage system. Upon completion of the request, the storage system (and operating system) returns a reply to the client 110 over the network 140.

A write operation issued by the client 110 to the storage system 120 follows the same "path" through the storage system 100, except that the operation may be temporarily stored ("queued") in memory for later commitment to disk 130. Likewise, the write operation follows the same software "path" through the storage operating system 200, except that the deduplication module 284 may extract data such as metadata associated with the appropriate entry in the inode file during the operation, in order to build a fingerprint entry corresponding to the logical vbn modified by the write operation, wherein the fingerprint entry may be stored in the dense tree structure 1000.

It should be noted that the software "path" through the storage operating system described above needed to perform data storage access and write operations for client requests received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in an embodiment, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software operating as a single or distributed system.

As used herein, the term "storage operating system" generally refers to the computer-executable code operable to perform a storage function in a storage system, e.g., that manages data access and may, in the case of a file server, implement file system semantics. In this sense, the Data ONTAP® software is an example of such a storage operating system implemented as a microkernel and including the file system 280 to implement the WAFL® file system semantics and manage data access. Illustratively, the storage operating system 200 includes the merge-sort module 286 for identifying duplicate fingerprint entries and a data deduplication module 284 for performing data deduplication according to the embodiments described here; however, in alternate embodiments, the fingerprint comparison and data deduplication functionality may be implemented in other modules of the storage operating system 200. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the embodiments described herein may apply to any type of special-purpose (e.g., file server, filer, or multi-protocol storage appliance) or general-purpose computer, including a standalone computer or portion thereof, embodied as or including a storage system 120. An example of a multi-protocol storage appliance that may be advantageously used with the embodiments herein is described in commonly owned U.S. Patent Application Publication No. 2004/0030668 A1, filed on Aug. 8, 2002, titled MULTI-PROTOCOL STORAGE APPLIANCE THAT PROVIDES INTEGRATED SUPPORT FOR FILE AND BLOCK ACCESS PROTOCOLS, by Brian Pawlowski, et al. Moreover, the embodiments herein can be adapted to a variety of storage system architectures including, but not limited to, a network-attached storage environment, a storage area network, and a disk assembly directly-attached to a client or host computer. The term "storage system" should therefore be taken broadly to include such arrangements in addition to any subsystems configured to perform a storage function and associated with other equipment or systems.

Figure 3:
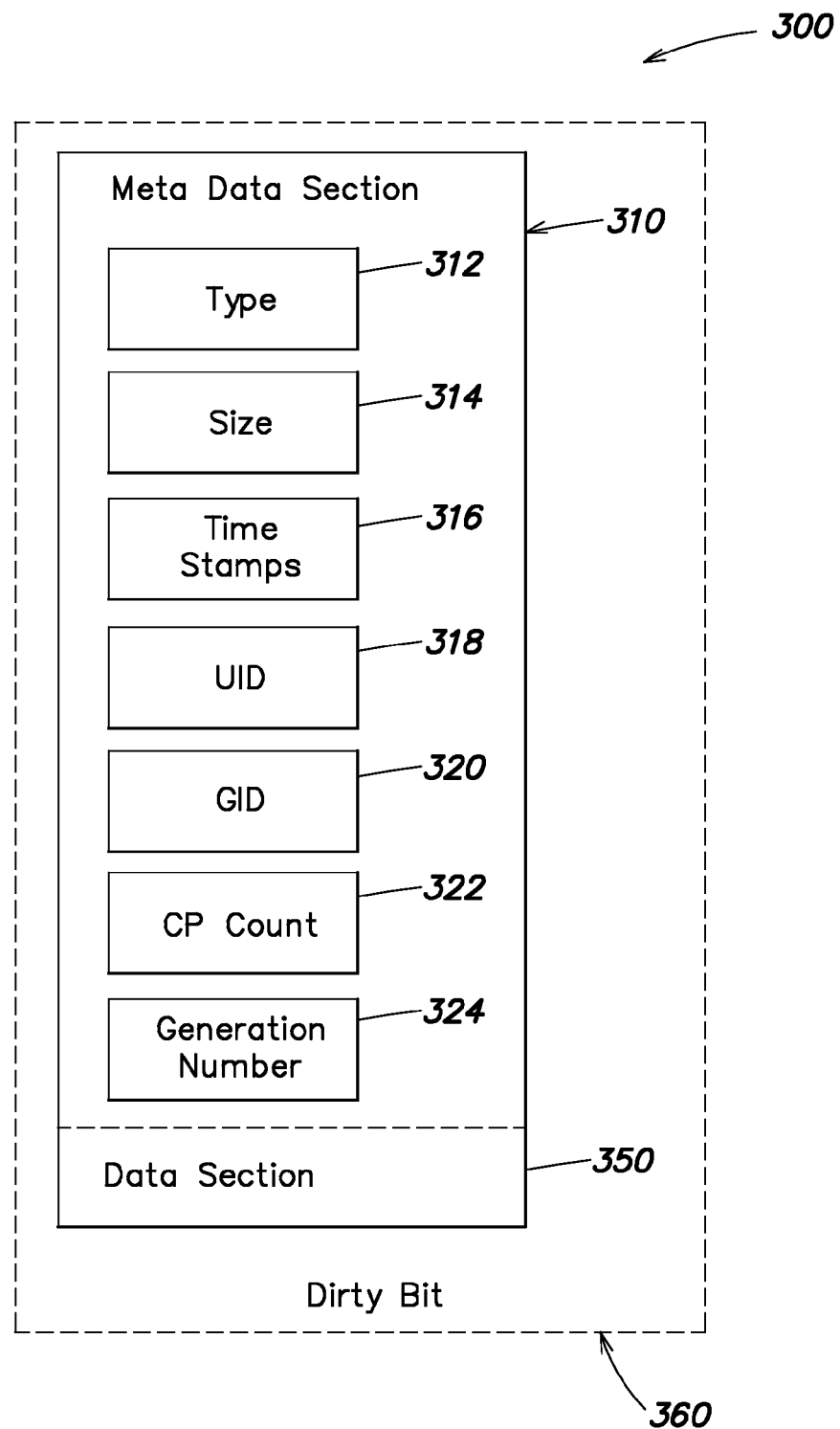
FIG. 3 is a schematic block diagram of an inode.

In an embodiment, a file (or other data container) is represented in the write-anywhere file system as an inode data structure adapted for storage on the disks 130. FIG. 3 is a schematic block diagram of an inode 300, which preferably includes a metadata section 310 and a data section 350. The information stored in the metadata section 310 of each inode 300 describes the file and, as such, includes the type (e.g., regular, directory, virtual disk) 312 of file, the size 314 of the file, time stamps (e.g., access and/or modification) 316 for the file, ownership, i.e., user identifier (UID 318) and group ID (GID 320), of the file, a consistency point (CP) count field 322, and a generation number field 324.

The CP count field 322 identifies the CP count at which this particular version of the inode was generated. The generation number field 324 identifies the generation of this particular inode. Illustratively, each time an inode is deleted and reused, its associated generation number field 324 is incremented. In a write anywhere file system, any time an inode is modified, a new copy is written to disk. At such time, i.e., during inode write allocation, these fields 322, 324 are updated. Thus, the generation number reflects inode creation/allocation, and the CP count reflects inode modification. The fields 322, 324 may be utilized to quickly determine whether a particular storage container represented by the inode has been modified since the time a fingerprint of the storage container was generated.

The contents of the data section 350 of each inode, however, may be interpreted differently depending upon the type of file (inode) defined within the type field 312. For example, the data section 350 of a directory inode contains metadata controlled by the file system, whereas the data section of a regular inode contains file system data. In this latter case, the data section 350 may include a representation of the data associated with the file.

According to an embodiment, the data section 350 of a regular on-disk inode may include file system data or pointers, the latter referencing 4 KB data blocks on disk used to store the file system data. Each pointer is preferably a logical vbn to facilitate efficiency among the file system and the RAID system 240 when accessing the data on disks. Given the restricted size (e.g., 128 bytes) of the inode, file system data having a size that is less than or equal to 64 bytes is represented, in its entirety, within the data section of that inode. However, if the file system data is greater than 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 350 of the inode (e.g., a second level inode) references an indirect block (e.g., a first level block) that contains 1024 pointers, each of which references a 4 KB data block on disk. For file system data having a size greater than 64 MB, each pointer in the data section 350 of the inode (e.g., a third level inode) references a double-indirect block (e.g., a second level block) that contains 1024 pointers, each referencing an indirect (e.g., a first level) block. The indirect block, in turn, contains 1024 pointers, each of which references a 4 KB data block on disk. When accessing a file, each block of the file may be loaded from disk 130 into memory.

When an on-disk inode (or block) is loaded from disk 130 into memory, for example, its corresponding in core structure embeds the on-disk structure. For example, the dotted line surrounding the inode 300 indicates the in core representation of the on-disk inode structure. The in core structure is a block of memory that stores the on-disk structure plus additional information needed to manage data in the memory (but not on disk). The additional information may include, e.g., a "dirty" bit 360. After data in the inode (or block) is updated/modified as instructed by, e.g., a write operation, the modified data is marked "dirty" using the dirty bit 360 so that the inode (block) can be subsequently "flushed" (stored) to disk. The in core and on-disk format structures of the WAFL® file system, including the inodes and inode file, are disclosed and described in U.S. Pat. No. 5,819,292, titled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al., issued on Oct. 6, 1998, the contents of which are herein incorporated by reference in its entirety.

Figure 4:
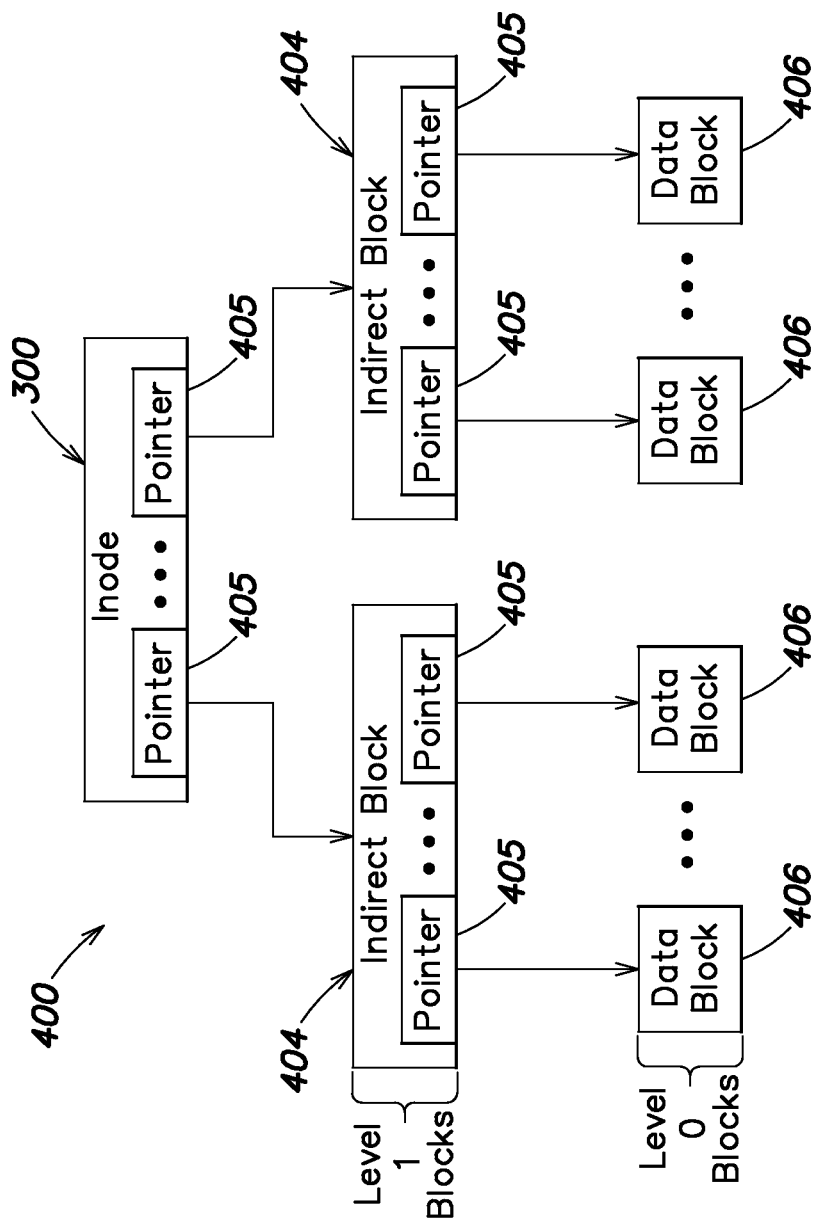
FIG. 4 is a schematic block diagram of a buffer tree of a storage container.

FIG. 4 is a schematic block diagram of a buffer tree of a data container that may be advantageously used with embodiments described herein. The buffer tree is an internal representation of blocks for a storage container (e.g., file 400) maintained by the write-anywhere file system 280. A root (top-level) inode 300, such as an embedded inode, references indirect (e.g., level 1) blocks 404. The indirect blocks (and inode) contain pointers 405 that ultimately reference data blocks 406 used to store the actual data of file 400. That is, the data of file 400 are contained in data blocks and the locations of these blocks are stored in the indirect blocks of the file. Each level 1 indirect block 404 may contain pointers to as many as 1024 data blocks. According to the "write anywhere" nature of the file system, these blocks may be located anywhere on the disks 130.

Figure 5:
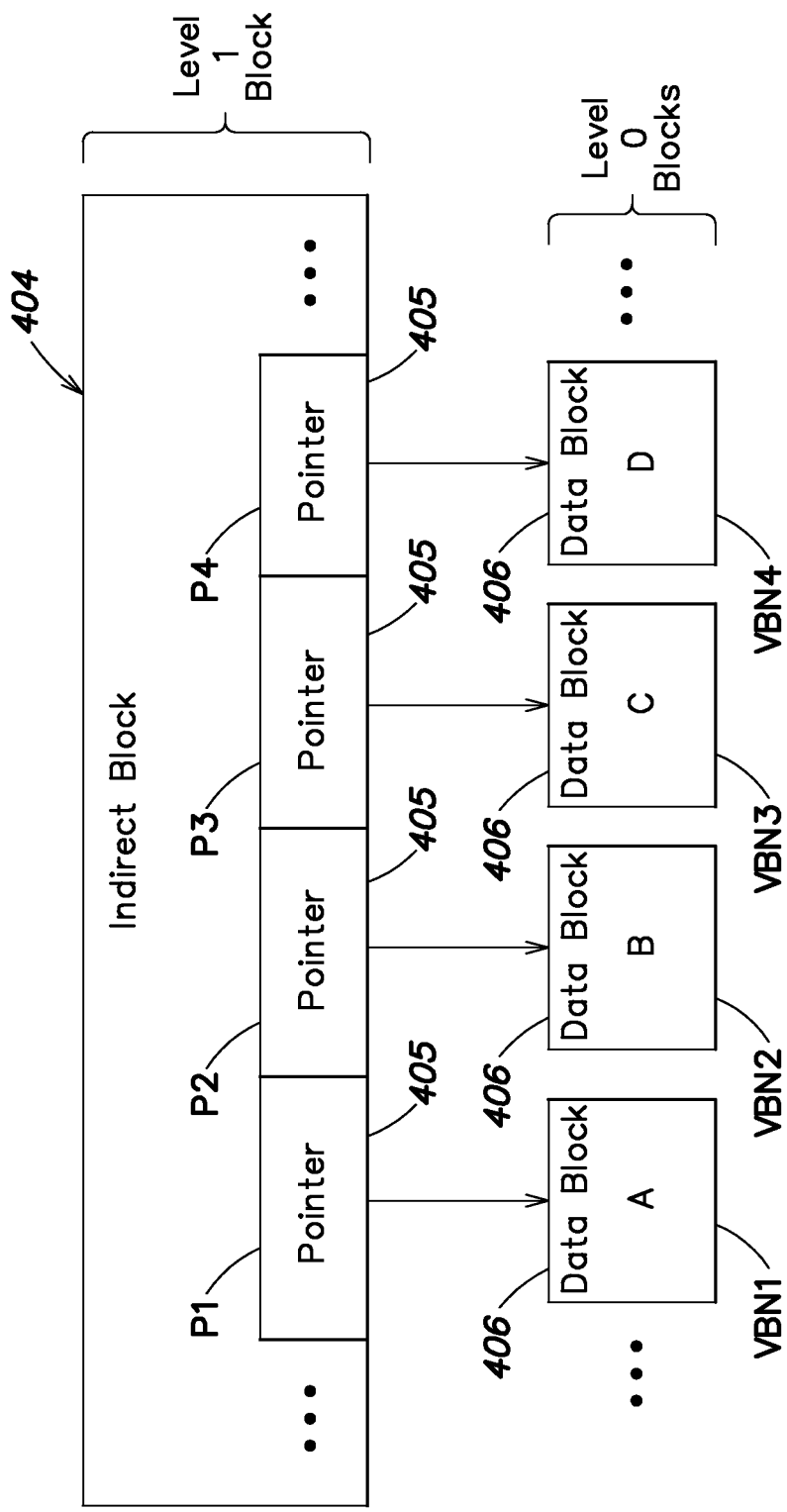
FIG. 5 is a schematic block diagram of an indirect block with pointers to data blocks.

FIG. 5 is a schematic block diagram of a level 1 indirect block 404 having pointers to a data blocks 406 in accordance with one or more embodiments herein. Illustratively, each data block 406 contains 4 KB of data. Notably, according to the write anywhere file layout, the level 0 data blocks may be located anywhere in the file system (i.e., they do not necessarily correspond to physically sequential blocks on a disk 130). In a storage operating system 200 adapted to eliminate and/or deduplicate data by the deduplication module 284, the data within each data block 406 may be associated with a fingerprint. For example, a storage container, e.g., a file, may contains a sequence of data blocks stored at, e.g., vbn1, vbn2, vbn3, and vbn4. Each unique data block is associated with a unique fingerprint, e.g., A, B, C, and D. Likewise, within the indirect block 404, a sequence of pointers, 405 e.g., P1, P2, P3, and P4, reference the data blocks vbn1, vbn2, vbn3, and vbn4 respectively.

Figure 6:
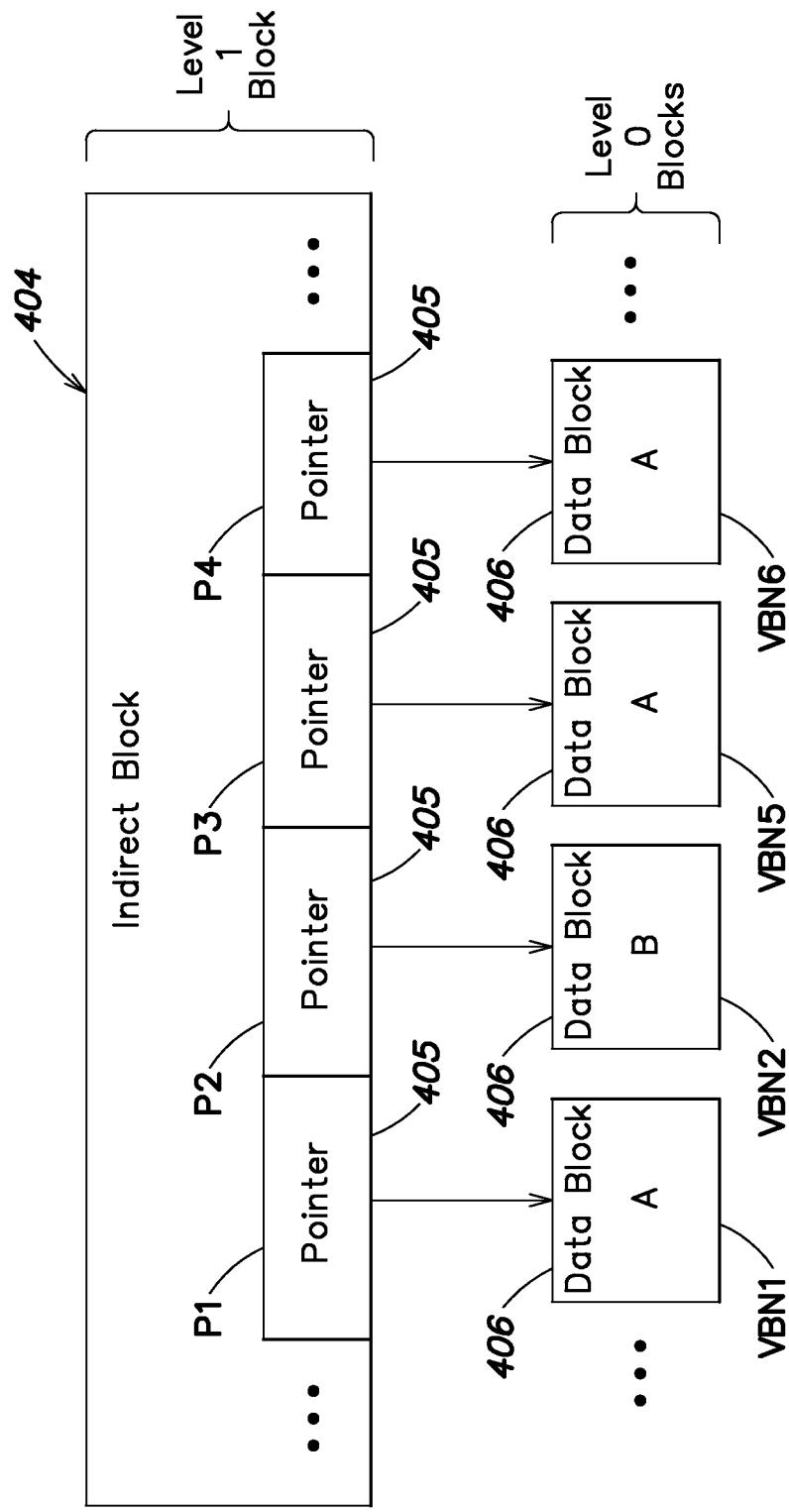
FIG. 6 is a schematic block diagram of an indirect block with pointers to modified data blocks.

FIG. 6 is a schematic block diagram of the level 1 indirect block 404 of FIG. 5 after write operations have modified the storage container. Illustratively, the two data blocks previously stored at vbn3 and vbn4 have been modified to contain a copy of the first data block stored at vbn 1, thereby making their associated fingerprints identical. The modified data blocks are thus associated with fingerprints A, B, A, and A respectively. According to the write anywhere file layout, two new vbns (vbn5 and vbn6) are allocated for the modified data. As a result, the deduplication module 284 may utilize the identical fingerprints, determined by the merge-sort module 286 and stored in the dense tree data structure 1000, to determine that the data blocks 406 stored at vbn5 and vbn6 contain a duplicate of the data stored in the data block 406 at vbn1. Having three copies of identical data is generally wasteful of file system resources; therefore the deduplication module 284 may modify pointers P3 and P4 to reference vbn1, thereby de-allocating vbn5 and vbn6 and conserving storage space while preserving the integrity of the storage container.

Figure 7:
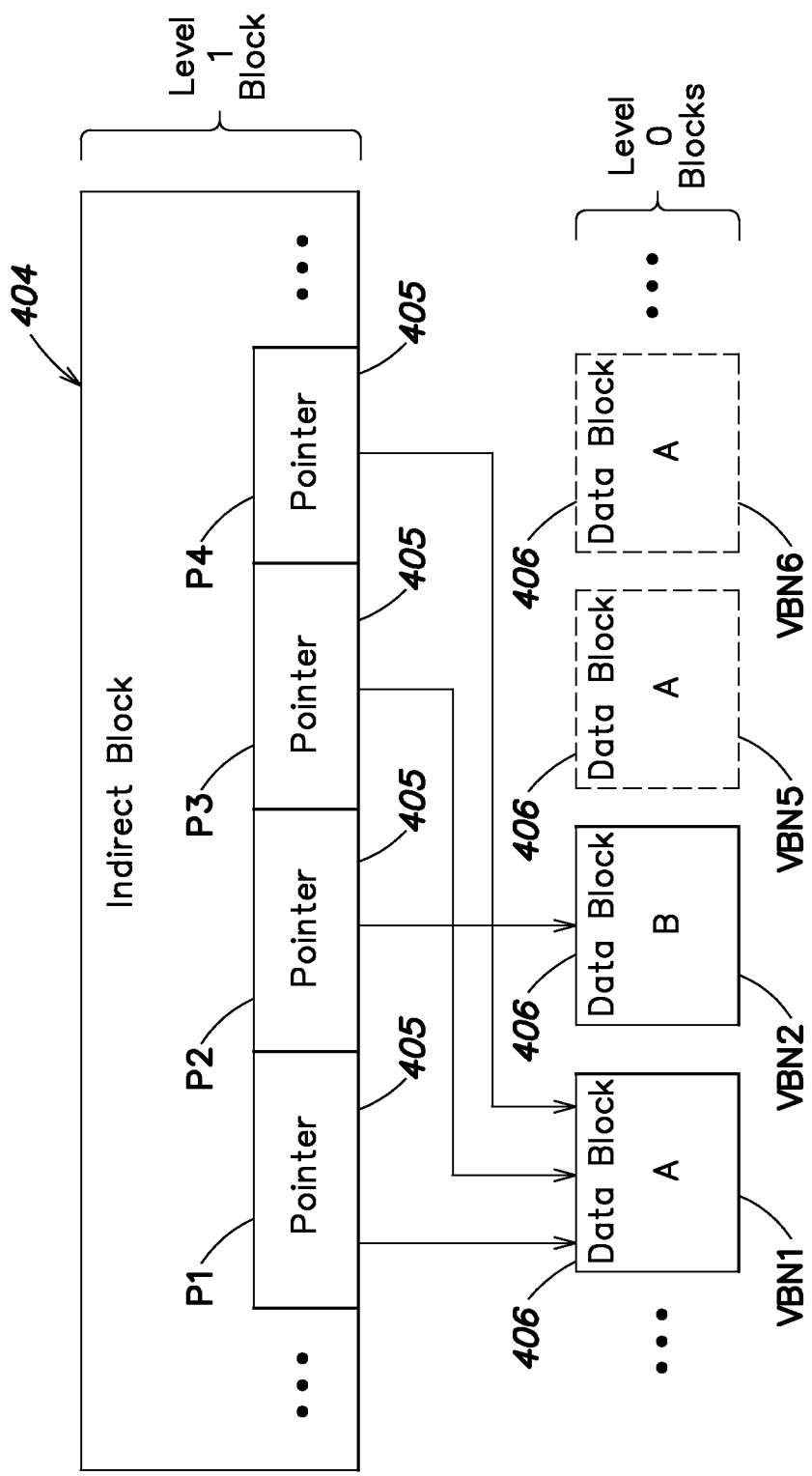
FIG. 7 is a schematic block diagram of an indirect block with pointers to deduplicated data blocks.

FIG. 7 is a schematic block diagram illustrating the level 1 indirect block 404 of FIG. 6 after performance of an exemplary data deduplication procedure by deduplication module 284. After the exemplary procedure, each unique data block is associated with a unique fingerprint, and identical file blocks of the storage container are associated with a unique data block, which, in turn, is associated with a unique fingerprint. A technique for implementing the deduplication procedure is further described in the above-incorporated United States Patent Application entitled METHOD AND APPARATUS FOR IDENTIFYING AND ELIMINATING DUPLICATE DATA BLOCKS AND SHARING DATA BLOCKS IN A STORAGE SYSTEM.

The fingerprint extraction layer 288 generates a fingerprint of a predefined size, e.g., 64 bits, for each data block 406 stored by the storage system 120. Illustratively, a first predetermined number of bits, e.g., the first 32 bits, of the fingerprint are provided from the result of a checksum calculation performed by the storage module, while a second predetermined number of bits, e.g., the second 32 bits, of the fingerprint are provided from data stored at one or more predefined offsets within the data block 406. The resulting fingerprint sufficiently reflects the contents of the data block 406 to enable identification of duplicates without an undesirable rate of false positives. Furthermore, because no additional cryptographic functions, such as hash functions, need to be performed to generate the fingerprint, processor utilization is reduced. A technique for generating a fingerprint is further described by commonly assigned U.S. Pat. No. 8,412,682, entitled SYSTEM AND METHOD FOR RETRIEVING AND USING BLOCK FINGERPRINTS FOR DATA DEDUPLICATION, issued on Apr. 2, 2013, the contents of which are hereby incorporated in its entirety.

Figure 8:
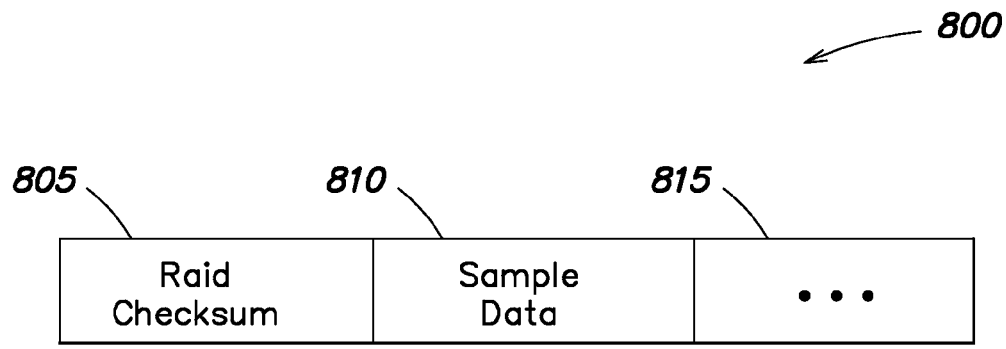
FIG. 8 is a schematic block diagram of a fingerprint.

FIG. 8 is a schematic block diagram showing elements of an exemplary fingerprint 800. The fingerprint 800 illustratively includes a RAID checksum field 805, a sample data field 810, and, in alternate embodiments, additional fields 815. It should be noted that in alternate embodiments additional and/or differing fields may be utilized. Alternatively, the fingerprint 800 may include the RAID checksum alone if the RAID checksum includes a checksum function that sufficiently meets the needs of the deduplication module.

As part of a typical write operation, the well-known RAID protocol verifies data integrity by implementing a checksum calculation for each block of data written to disk. Illustratively, for each write operation directed to a data block 406, the fingerprint extraction layer 286 identifies and copies a 32-bit checksum value, calculated according to the RAID protocol, into the RAID checksum field 805 of the fingerprint 800. Thus, the process of generating fingerprints is optimized to take advantage of a pre-calculated checksum value associated with each data block 406. Alternately, the RAID checksum field 805 may include only a portion of the 32-bit checksum value calculated according to the RAID protocol, either alone or in combination with other values. Likewise, where the storage protocol generates a checksum value other than a 32-bit RAID checksum value, the fingerprint 800 may implement this other checksum value in the RAID checksum field 805. Alternately, the RAID checksum field 805 may include the results of other cryptographic functions, such as a hash function, associated with data stored in the data block 406.

Illustratively, the sample data field 810 contains a copy of data stored at one or more predefined offsets within the data block 406 associated with the fingerprint 800. For example, where the data block 406 contains 4 KB of data, the sample data field 810 may be 32 bits (4 bytes) long, containing a copy of every 1024th bit (i.e., the first bit of every 128th byte) stored in the data block 406. Alternately, the sample data field 810 may contain a copy of 32 contiguous bits stored at a single offset within the data block 406. The resulting fingerprint 800 sufficiently reflects the contents of the data block 406 to enable identification of duplicates without an undesirable rate of false positives. Thus, again, the process of generating fingerprints is optimized to take advantage of data already provided to the storage operating system 200, without requiring additional hash calculations and/or cryptographic functions to be performed by the storage operating system 200. According to one or more embodiments, the RAID checksum field 805 and sample data field 810 may be combined with additional fields 815 containing other data associated with the data block 406, including, e.g., the result of additional hash calculations and/or cryptographic functions performed by the storage operating system 200.

Figure 9:
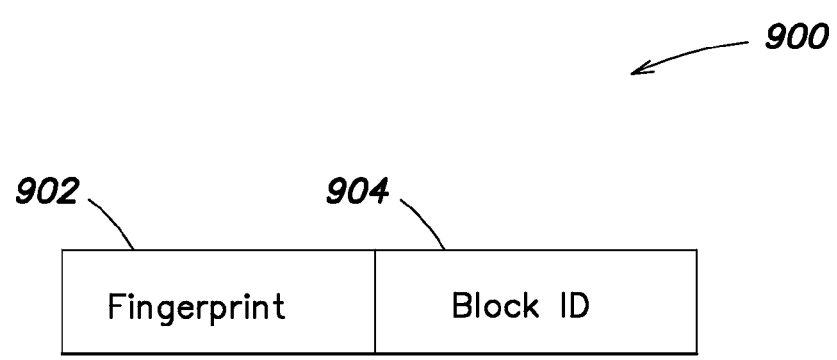
FIG. 9 is a schematic block diagram of a data entry for a dense tree structure.

FIG. 9 is a block diagram of a data entry of the dense tree data structure. Each entry 900 may be configured to store the fingerprint (FIG. 8) generated for a data block in field 902. Further, entry 900 may be configured to store one or more block identification (ID) values (e.g., vbn) associated with one or more respective data blocks, in field 904.

Figure 10:
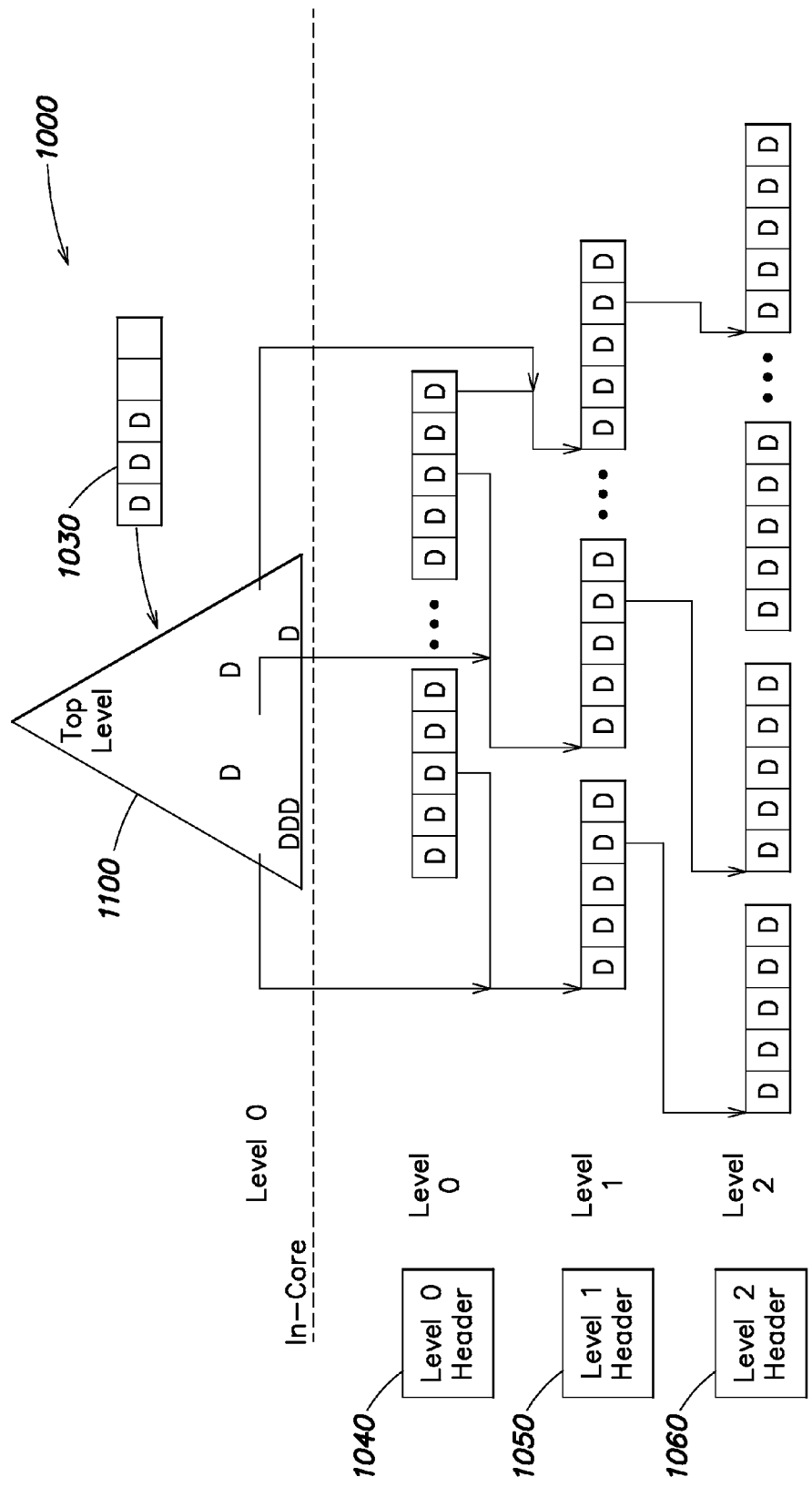
FIG. 10 is a schematic block diagram of the dense tree data structure.

FIG. 10 is a block diagram of the dense tree data structure that may be advantageously used with one or more embodiments described herein. The dense tree data structure 1000 is configured to store fingerprints within its entries 900. Illustratively, the dense tree data structure is organized as a multi-level dense tree 1000, where a top level 1100 stores newer fingerprints and subsequent descending levels store older fingerprints. Specifically, a higher level of the dense tree 1000 is updated first and, when that level fills, an adjacent lower level is updated, e.g., via a merge operation performed by the merge-sort module 286. Each level of the dense tree 1000 includes fixed size records or entries, e.g., 900, for storing fingerprints. The top level 1100 of the dense tree resides in memory (in-core) as a balanced tree (B+ tree). A fixed sized (e.g., 4 KB) buffer may also be maintained in memory as a staging area (i.e., an in-core staging buffer 1030) for entries 900 inserted into the balanced tree (i.e., top level 1100). Each level of the dense tree is further maintained on disk as a packed array of entries. Notably, the staging buffer 1030 is de-staged to disk upon a trigger, e.g., the staging buffer being full. An example of a dense tree data structure is described in U.S. patent application Ser. No. 14/084,137, entitled DENSE TREE VOLUME METADATA UPDATE LOGGING AND CHECKPOINTING, filed on Nov. 19, 2013.

In an embodiment, the multi-level dense tree 1000 includes three (3) levels, although it will be apparent to those skilled in the art that additional levels N of the dense tree may be included depending on parameters (e.g., size) of the dense tree configuration. Illustratively, the top level 1100 of the tree is maintained in memory as level 0 and the lower levels are maintained on disks 130. In addition, copies of the entries 900 stored in staging buffer 1030 may also be maintained on disk. A leaf level, e.g., level 2, and non-leaf level, e.g., level 0 or 1, of the dense tree contains data entries 900. Each level of the dense tree 600 also includes a header (e.g., level 0 header 1040, level 1 header 1050 and level 2 header 1060) that contains per level information, such as reference counts associated with the fingerprints.

Figure 11:
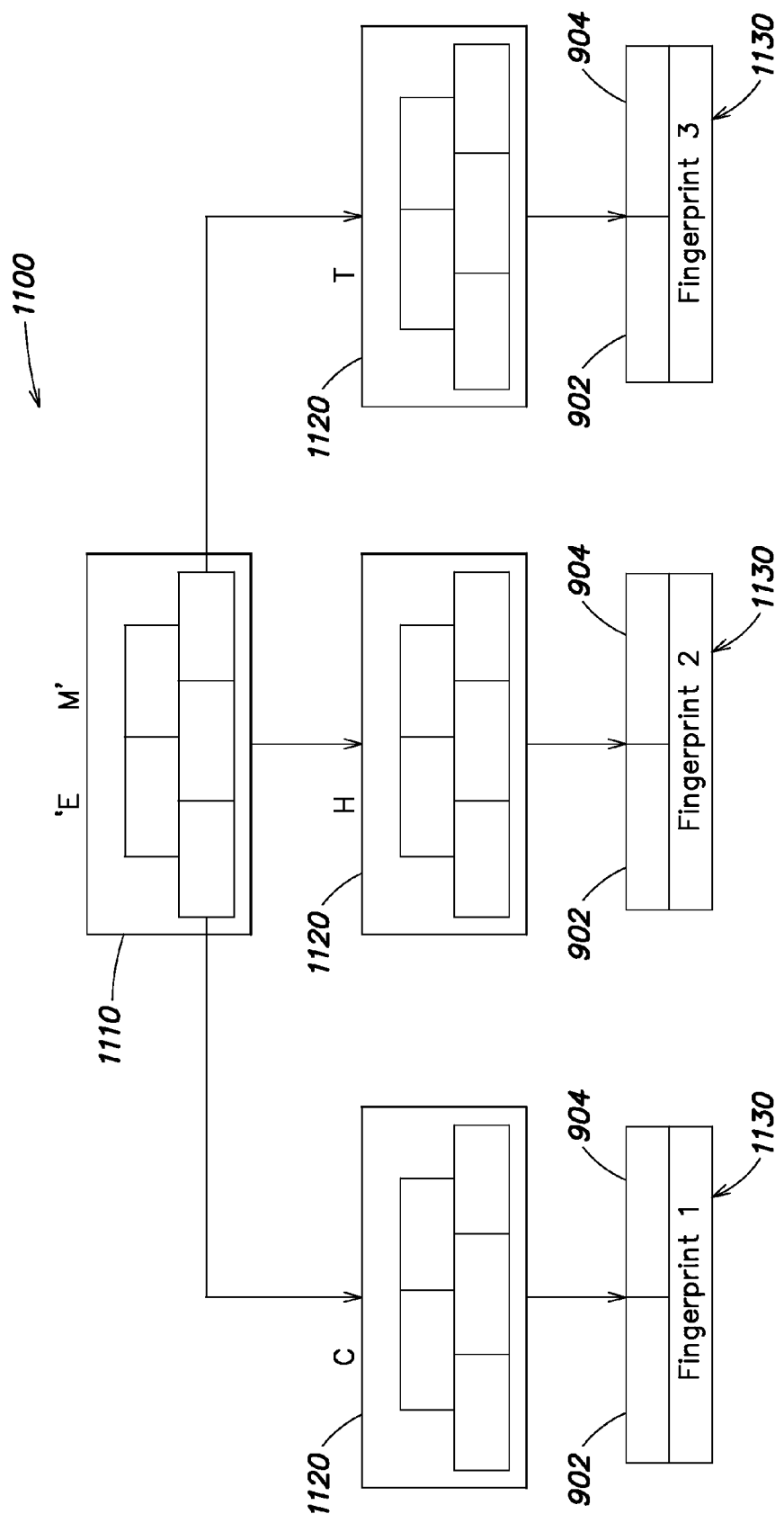
FIG. 11 is a schematic block diagram of a top level of the dense tree data structure.

FIG. 11 is a block diagram of the top level 1100 of the dense tree data structure. As noted, the top level (level 0) of the dense tree 1000 is maintained in memory 124 (in-core) as a balanced tree, which is illustratively embodied as a B+ tree data structure. However, it will be apparent to those skilled in the art that other data structures, such as AVL trees, Red-Black trees, and heaps (partially sorted trees), may be advantageously used with the embodiments described herein. The B+ tree (top level 1100) includes a root node 1110, one or more internal nodes 1120 and a plurality of leaf nodes (leaves) 1130. The fingerprints stored in entries 900 on the tree are preferably organized in a manner that is efficient to accomplish merges to lower levels of the tree. The B+ tree has certain properties that satisfy these requirements, including storage of all data (i.e., entries 900) in leaves 1130 and storage of the leaves as sequentially accessible.

In an embodiment, the value of the calculated fingerprint may be utilized, by the merge-sort module 286, to store the fingerprint in the top level (level 0) of the dense tree 100 in a manner that facilitates searching and sorting thereof. For purposes of depiction and description, the root node 1110 may include two threshold values, "E" and "M" illustratively representative of the calculated fingerprints, and the internal nodes 1120 may include other representative threshold values such as "C", "H", and "T", respectively. If the value of a calculated fingerprint is less than "E" and "M", such as "B", the fingerprint (e.g., fingerprint 1) may be stored at the position as illustrated in FIG. 11 based on the thresholds of the root node 1110 and the internal node 1120 (e.g., "C"). If the value of the calculated fingerprint is between "E" and "M", the fingerprint (e.g., fingerprint 2) may be stored at a different position as illustrated in FIG. 11 based on the thresholds of the root node 1110 and the internal node 1120 (e.g., "H"). Moreover, if the value of the calculated fingerprint is greater than "E" and "M", the fingerprint (e.g., fingerprint 3) maybe stored at a different position as illustrated in FIG. 11 based on the thresholds of the root node 1110 and the internal node 1120 (e.g., "T"). Advantageously, the merge-sort module 286 may search and sort the fingerprints in an efficient manner.

Figure 12:
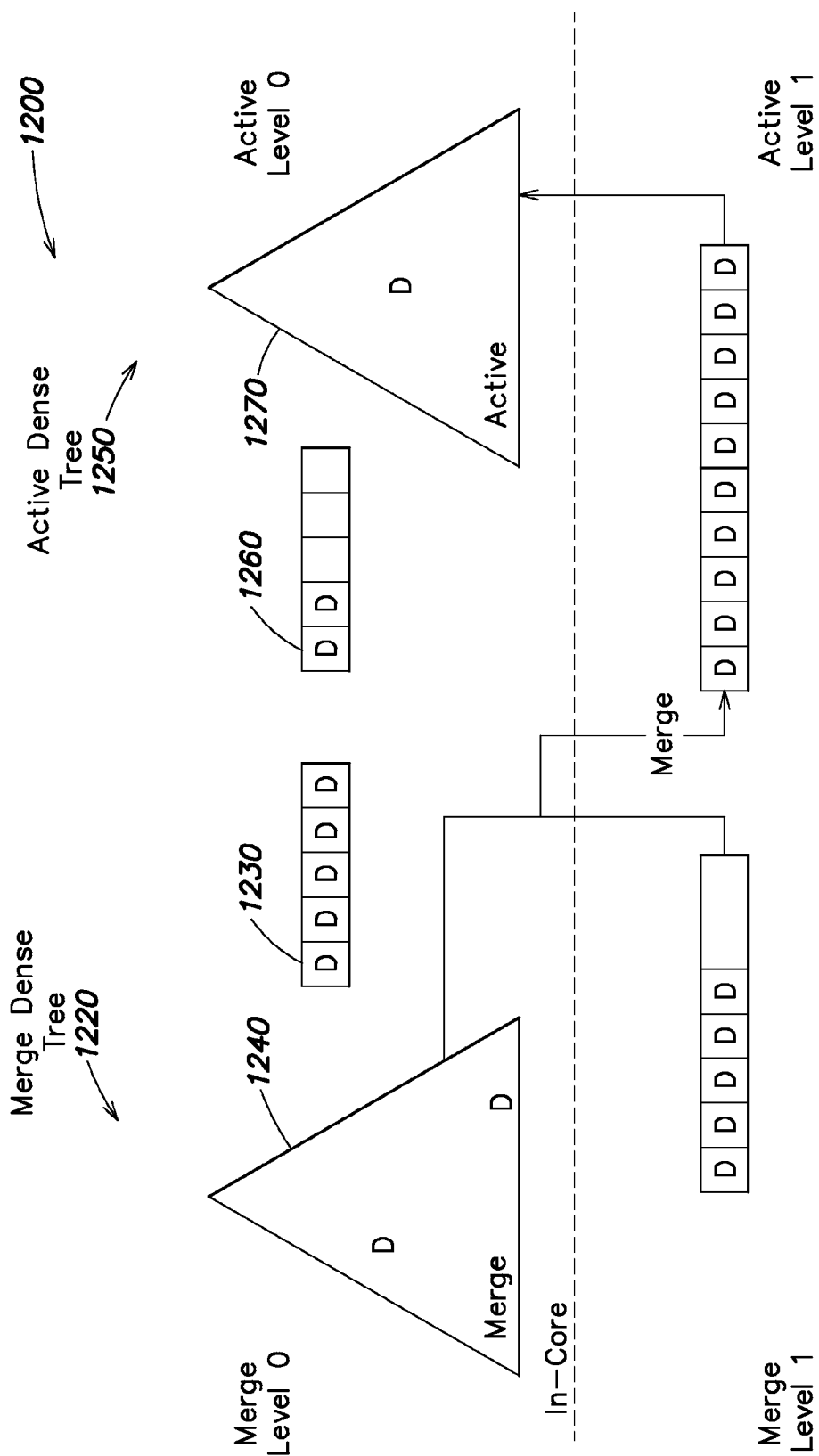
FIG. 12 illustrates merging between levels of the dense tree data structure.

FIG. 12 illustrates merging 1200 between levels, e.g., levels 0 and 1, of the dense tree data structure 1000. In an embodiment, a merge operation is triggered when level 0 is full. When performing the merge operation, the dense tree metadata structure transitions to a "merge" dense tree structure (shown at 1220) that merges, while an alternate "active" dense tree structure (shown at 1250) is utilized to accept incoming data. Accordingly, two in-core level 0 staging buffers 1230, 1260 are illustratively maintained for concurrent merge and active (write) operations, respectively. In other words, an active staging buffer 1260 and active top level 1270 of active dense tree 1250 handle in-progress data flow (i.e., active user read and write requests), while a merge staging buffer 1230 and merge top level 1240 of merge dense tree 1220 handle consistency of the data during a merge operation. That is, a "double buffer" arrangement may be used to handle the merge of data (i.e., entries in the level 0 of the dense tree) while processing active operations.

During the merge operation, the merge staging buffer 1230, as well as the top level 1240 and lower level array (e.g., merge level 1) are read-only and are not modified. The active staging buffer 1260 is configured to accept the incoming (user) data, i.e., the entries received from newly generated fingerprints are loaded into the active staging buffer 1260 and added to the top level 1270 of the active dense tree 1250. Illustratively, merging of entries 900 by the merge-sort module 286 flushes/copies entries 900 (storing fingerprints) from level 0 to level 1 within the merge dense tree 1220, resulting in creation of a new active level 1 for the active dense tree 1250, i.e., the resulting merged level 1 from the merge dense tree is inserted as a new level 1 into the active dense tree. More specifically, during the merge operation implemented by the merge-sort module 286, duplicate fingerprints 800 stored in entries 900 are identified, which, in turn, indicate duplicate data blocks to be subsequently removed.

Note that, according to the illustrative embodiment, a pair of duplicate fingerprints might be "false positives", meaning they do not correspond to actual duplicate data blocks. Therefore, prior to deduplication, the identified data blocks are compared byte-by-byte to verify that they are actual duplicates. Therefore, references to "identical" or "duplicate" data blocks, as used herein, should be interpreted to possibly include a low percentage of data blocks that are not, in fact, duplicates (i.e., false positives). According to alternate embodiments, however, different values may be copied into the RAID checksum and sample data fields 805, 810, and/or additional fields 815 may be implemented in each fingerprint 800. For example, the fingerprint 800 may include, e.g., the result of a cryptographic hash function that guarantees a zero probability of false positives. Therefore, according to alternate embodiments, performing byte-by-byte data block comparisons during data deduplication may be unnecessary. A technique for identifying duplicate fingerprints is further described by commonly assigned U.S. Pat. No. 8,412,682, entitled SYSTEM AND METHOD FOR RETRIEVING AND USING BLOCK FINGERPRINTS FOR DATA DEDUPLICATION, issued on Apr. 2, 2013, the contents of which are hereby incorporated in its entirety.

Upon completion of the merge, the root, e.g., active top level 1270 and active level 0 header (not shown), of the active dense tree 1250 are utilized, thereby deleting (i.e., rendering inactive) merge level 0 and merge level 1 of the merge dense tree 1220. The merge staging buffer 1230 (and the top level 1140 of the dense tree) thus becomes an empty inactive buffer until the next merge. The merge data structures (i.e., the merge dense tree 12120 including staging buffer 1230) may be maintained in-core and "swapped" as the active data structures at the next merge (i.e., "double buffered"). Once the duplicate fingerprints have been identified by merge-sort module during a merge operation as described, the merge-sort module may pass information (e.g., block IDS, such as vbns, corresponding to the identified fingerprints stored in field 902 of entry 900) to the deduplication module 284 to identify duplicate data stored on disks 130 and update the pointers. Specifically, the deduplication module 284 performs data deduplication, as illustrated above in reference to FIGS. 5, 6, and 7.

Figure 13:
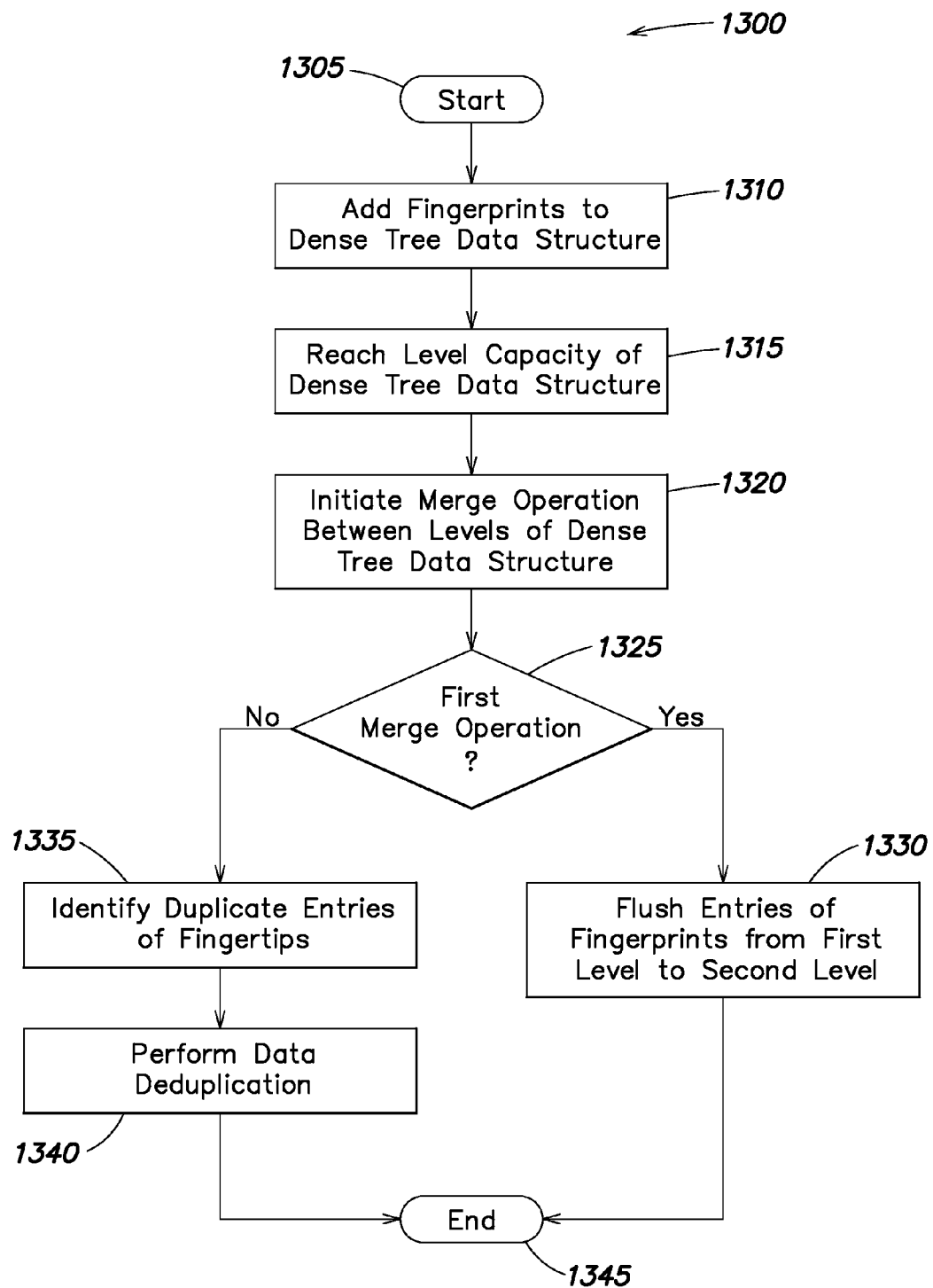
FIG. 13 is a flowchart detailing the steps of a procedure for post-processing data deduplication.

FIG. 13 is a flowchart detailing the steps of a procedure 1300 for identifying duplicate data blocks 406 in accordance with a post-processing embodiment described herein. The procedure 1300 starts at step 1305 and continues to step 1310, where generated fingerprints are added to entries 900 of the dense tree structure 1000. Specifically, the fingerprints may be added to the entries at level 0 of the dense tree structure 1000. At step 1315, the level of the dense tree reaches a capacity. For example, level 0 may reach a threshold limit capacity designated to trigger a merge operation. Specifically, an administrator may indicate when the capacity level 0 meets a certain threshold, the content of level 0 should be merged to level 1. At step 1320, a merge operation between a first level and a second level of the dense tree is initiated. For example, if level 0 has reached the threshold, the entries 900 of level 0 are merged to level 1, where the level 1 has a larger storage capacity than level 0. At step 1325 a determination is made as to whether the merge operation between the first level and the second level is a first merge operation. If, at step 1325, it is determined that the merge operation is the first merge operation, the procedure branches to step 1330 and the entries from the first level are flushed to the second level. If, at step 1325, it is determined that the merge operation is not the first operation, the procedure branches to step 1335, and duplicate entries 900, e.g., fingerprints, are identified in response to the initiation of the merge operation. For example, the merge-sort module 286 may compare the fingerprints in level 0 with the fingerprints in level 1 to identify the duplicate fingerprints. Illustratively, the comparison is a bitwise comparison between two fingerprints, performed by the merge-sort module 286. According to alternate embodiments, the comparison may be, e.g., bytewise and/or another method of identifying identical data. The procedure continues to step 1340, where the deduplication module 284 performs data deduplication corresponding to identified duplicate fingerprint(s), as illustrated above in reference to FIGS. 5, 6, and 7. For example, if a first fingerprint and a second fingerprint are duplicates, the merge-sort module 286 may identify the block IDs associated with the first and second fingerprints (e.g., fields 902 of the entries) and send such information to deduplication module 284 to perform data deduplication. The procedure 1300 completes (ends) at step 1345.

Figure 14:
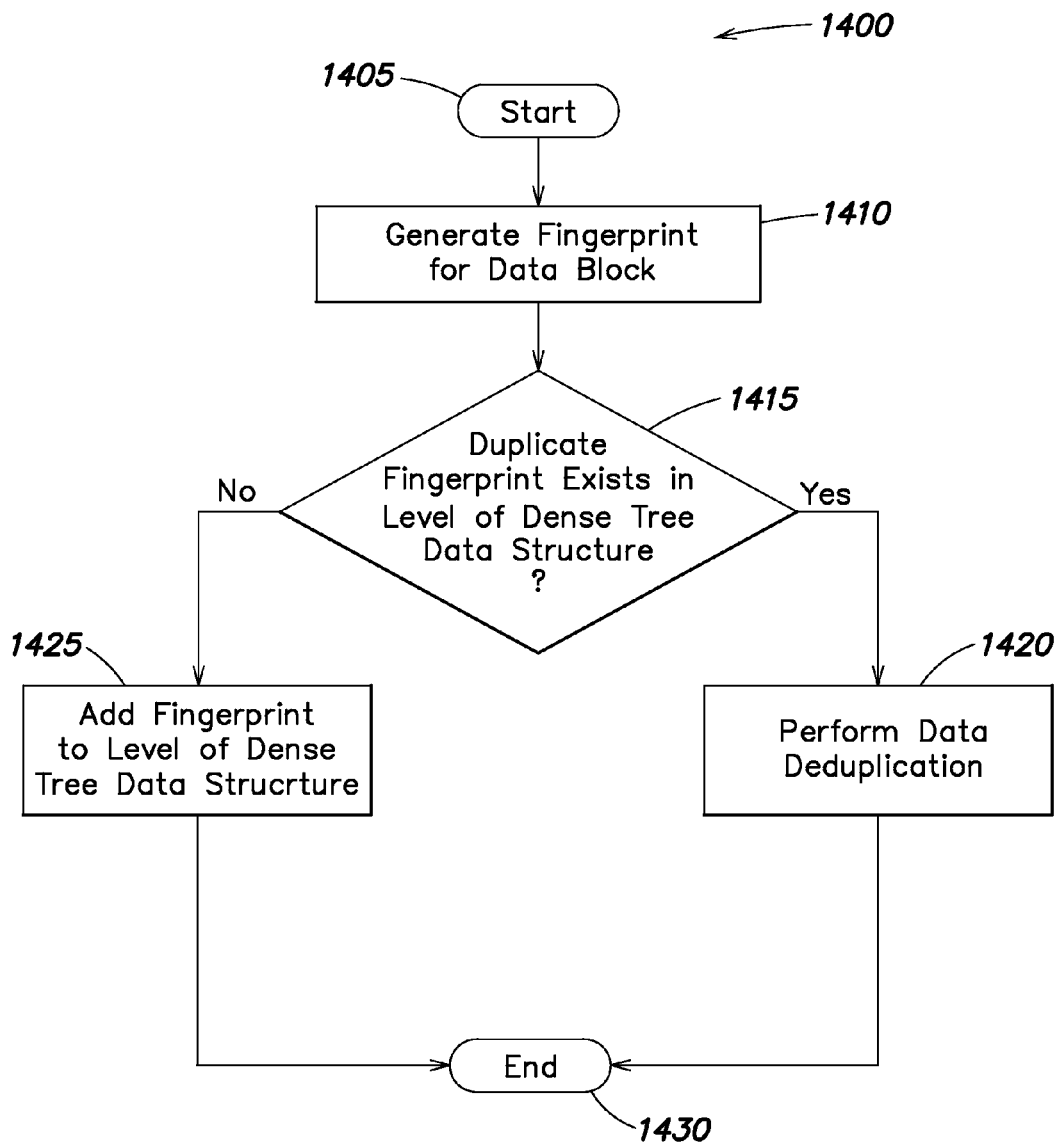
FIG. 14 is a flowchart detailing the steps of a procedure for in-line data deduplication.

FIG. 14 is a flowchart detailing the steps of a procedure 1400 for identifying duplicate data blocks 406 in accordance with an in-line embodiment described herein. The procedure 1400 starts at step 1405 and continues to step 1410, where a fingerprint for a data block is generated. For example, new data may be written to the storage system in response to a write request. At step 1415, a determination is made as to whether a duplicate of the generated fingerprint exists at the level in the dense tree. Specifically, the generated fingerprint is compared to the other fingerprints stored in entries at a level of the dense tree. For example, the generated fingerprint may be compared to the other fingerprints that are already stored in entries 900 at level 0 of the dense tree data structure 1000. In addition, the generated fingerprint may be compared to other fingerprints stored in entries at one or more lower levels (e.g., level 1 and level 2) of the dense tree data structure. Specifically, an index entry of the dense tree data structure may point to a staring location of a different lower level of the dense tree data structure. In response to determining that a duplicate of the generated fingerprint exists, the procedure branches to 1420 where the deduplication module 284 performs data deduplication, as illustrated above in reference to FIGS. 5, 6, and 7, and stores the generated fingerprint (and block id) as a new entry 900 in the level of the dense tree. In response to determining that a duplicate of the generated fingerprint does not exist, the procedure branches to 1425 where the generated fingerprint (and block id) is stored as a new entry 900 in the level of the dense tree data structure 1000. The procedure 1400 completes (ends) at step 1430.

The foregoing description has been directed to specific embodiments. It will be apparent, however, that other variations and modifications may be made to the described embodiments, with the attainment of some or all of their advantages. It is expressly contemplated that the procedures, processes, and methods described herein may be implemented in alternative orders. For example, when a first merge sort operation between levels of the dense tree is initiation, the fingerprints in the level may be compared with each other to identify duplicate fingerprints instead of simply flushing the fingerprints to the lower level. Further, although reference is made to performing post-processing deduplication and in line deduplication independently, it is expressly contemplated that that the embodiments may be used together. For example, post-processing deduplication can be implemented for one or more levels of the dense tree (e.g., level 0 and level 1) while post-processing deduplication can be implemented for one or more other levels of the dense tree (e.g., level 2).

Moreover, although reference is made to comparing the generated fingerprint with fingerprints stored at a single level (e.g., level 0) of the dense tree structure, it is expressly contemplated that the generated fingerprint may be compared to fingerprints stored at one or more other levels of the dense tree data structure (e.g., level 1 and 2) to identify duplicate fingerprints. Furthermore, the embodiments here can be implemented as software (including a computer-readable medium having program instructions executing on a computer), hardware, firmware, or a combination thereof. While this description has been written in terms of a file system, the present invention also may be utilized with non-file system storage, such as luns and/or other block based storage. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
generating, by a processor, a fingerprint identifying data to be stored on one or more storage devices;
inserting the fingerprint into a first level of a dense tree data structure having a plurality of levels;
initiating a merge operation between the first level and a second level of the dense tree data structure based on the first level of the dense tree being filled to a threshold capacity, wherein the first level of the dense tree stores a first set of fingerprints and the second level stores a second set of fingerprints; and
in response to initiating the merge operation, comparing the first set of fingerprints stored in the first level with the second set of fingerprints stored in the second level of the dense tree data structure to identify one or more duplicate fingerprints and performing data deduplication for selected data, corresponding to the one or more identified duplicate fingerprints, stored on the one or more storage devices.

2. The method of claim 1, wherein the first level is level 0 of the dense tree data structure.

3. The method of claim 1, further comprising:
generating a different fingerprint;
comparing the different fingerprint with other fingerprints stored in a third level of the dense tree data structure to identify another duplicate fingerprint; and
in response to identifying the another duplicate fingerprint in the dense tree data structure, performing data deduplication for identified data corresponding to the identified another duplicate fingerprint.

4. The method of claim 1 wherein a capacity of the second level of the dense tree data structure is greater than a capacity of the first level of the dense tree data structure.

5. The method of claim 1 wherein the dense tree data structure is a B+ tree.

6. A method comprising: generating, by a processor, a fingerprint identifying data to be stored on one or more storage devices; comparing the fingerprint with other fingerprints stored in a first level of a dense tree data structure having a plurality of levels, to identify a duplicate fingerprint; in response to identifying the duplicate fingerprint in the dense tree data structure, performing data deduplication associated with the identified data stored on the one or more storage devices, wherein the identified data corresponds to the identified duplicate fingerprint, and storing the fingerprint in the first level of the dense tree data structure; and in response to not identifying the duplicate fingerprint in the dense tree data structure, storing the fingerprint in the first level of the dense tree data structure.

7. The method of claim 6, wherein the first level is level 0 of the dense tree data structure.

8. The method of claim 7, wherein the level 0 of the dense tree data structure is stored in a memory coupled to the processor.

9. The method of claim 6 wherein the dense tree data structure is a B+ tree.

10. The method of claim 6 wherein the first level of the dense tree has a smaller storage capacity than each other level of the dense tree data structure.

11. The method of claim 6, further comprising comparing the fingerprint with the other fingerprints stored in one or more other levels of the dense tree data structure to identify one or more other duplicate fingerprints and performing data deduplication for the one or more other identified duplicate fingerprints.

12. A system, comprising:
a processor configured to execute one or more processes; and
a memory configured to store a process executable by the processor, the process configured to:
generate a fingerprint identifying data to be stored on one or more storage devices;
insert the fingerprint into a first level of a dense tree data structure having a plurality of levels;
initiate a merge operation between the first level and a second level of the dense tree data structure in response to the first level being filled to a threshold capacity, wherein the first level of the dense tree stores a first set of fingerprints and the second level stores a second set of fingerprints;
compare the first set of fingerprints stored in the first level and with the second set of fingerprints stored in the second level of the dense tree data structure to identify one or more duplicate fingerprints in response to initiating the merge operation; and
perform data deduplication for selected data, corresponding to the one or more identified duplicate fingerprints, stored on the one or more storage device.

13. The system of claim 12, wherein the first level is level 0 of the dense tree data structure.

14. The system of claim 13, wherein the level 0 of the dense tree data structure is stored in the memory.

15. The system of claim 14, wherein the second level of the dense tree data structure is stored on the one or more storage devices.

16. The system of claim 12 wherein the fingerprint and an identification value associated with the data are stored in an entry of the dense tree data structure.

17. The system of claim 12, wherein the processor, configured to perform data deduplication, is further configured to:
update a pointer associated with the selected data to reference other data already stored on the one or more storage devices; and
erase the selected data from the one or more storage devices.

18. The system of claim 12, wherein the dense tree data structure is a B+ tree.

19. The system of claim 12, wherein the first level of the dense tree has a smaller storage capacity than each other level of the dense tree data structure.

* * * * *